United States Patent
Shih et al.

(10) Patent No.: US 11,979,854 B2
(45) Date of Patent: *May 7, 2024

(54) METHOD FOR MONITORING PAGING AND APPARATUS USING THE SAME

(71) Applicant: FG Innovation Company Limited, Tuen Mun (HK)

(72) Inventors: Mei-Ju Shih, Taipei (TW); Hung-Chen Chen, Taipei (TW); Yung-Lan Tseng, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 50 days.

This patent is subject to a terminal disclaimer.

(21) Appl. No.: 17/539,511

(22) Filed: Dec. 1, 2021

(65) Prior Publication Data

US 2022/0095270 A1    Mar. 24, 2022

Related U.S. Application Data

(63) Continuation of application No. 16/838,013, filed on Apr. 1, 2020, now Pat. No. 11,229,003.

(Continued)

(51) Int. Cl.
*H04W 68/00* (2009.01)
*H04W 24/08* (2009.01)
(Continued)

(52) U.S. Cl.
CPC ......... *H04W 68/005* (2013.01); *H04W 24/08* (2013.01); *H04W 56/001* (2013.01);
(Continued)

(58) Field of Classification Search
CPC . H04W 68/005; H04W 76/11; H04W 72/042; H04W 24/08; H04W 76/28;
(Continued)

(56) References Cited

U.S. PATENT DOCUMENTS

2018/0026698 A1    1/2018  Lee et al.
2018/0077729 A1*   3/2018  Lee .................. H04W 74/0833
(Continued)

FOREIGN PATENT DOCUMENTS

CN    103748804 A    4/2014
CN    106465352 A    2/2017
(Continued)

OTHER PUBLICATIONS

Ericsson, "Paging Occasions in NR", 3GPP TSG RAN WG2#101 R2-1802338, 3GPP, Feb. 15, 2018.
(Continued)

*Primary Examiner* — Inder P Mehra
(74) *Attorney, Agent, or Firm* — ScienBiziP, P.C.

(57) ABSTRACT

A method for monitoring paging is provided. The method is performed by a user equipment (UE) and includes actions of receiving a first Physical Downlink Control Channel (PDCCH) addressed to a first Radio Network Temporary Identifier (RNTI), and stopping monitoring a second PDCCH addressed to a second RNTI if the first PDCCH includes a paging stop indicator, where the second RNTI is the same as the first RNTI.

20 Claims, 5 Drawing Sheets

Related U.S. Application Data

(60) Provisional application No. 62/829,214, filed on Apr. 4, 2019, provisional application No. 62/829,223, filed on Apr. 4, 2019.

(51) Int. Cl.
| | |
|---|---|
| *H04W 56/00* | (2009.01) |
| *H04W 68/02* | (2009.01) |
| *H04W 72/23* | (2023.01) |
| *H04W 76/11* | (2018.01) |
| *H04W 76/27* | (2018.01) |
| *H04W 76/28* | (2018.01) |

(52) U.S. Cl.
CPC ............ *H04W 72/23* (2023.01); *H04W 76/11* (2018.02); *H04W 76/27* (2018.02); *H04W 76/28* (2018.02)

(58) Field of Classification Search
CPC ... H04W 56/001; H04W 76/27; H04W 72/23; H04W 68/02
USPC .......................................................... 370/329
See application file for complete search history.

(56) References Cited

U.S. PATENT DOCUMENTS

| | | | | |
|---|---|---|---|---|
| 2018/0145800 | A1 | 5/2018 | Srivastav et al. | |
| 2018/0192436 | A1* | 7/2018 | Yi | H04W 72/23 |
| 2018/0279268 | A1* | 9/2018 | You | H04L 5/00 |
| 2019/0021119 | A1* | 1/2019 | Ng | H04W 72/23 |
| 2019/0261431 | A1* | 8/2019 | Tsai | H04W 72/23 |
| 2019/0313445 | A1* | 10/2019 | Tsai | H04L 5/001 |
| 2020/0084746 | A1* | 3/2020 | Rune | H04W 68/02 |
| 2021/0168738 | A1* | 6/2021 | Shih | H04W 72/23 |
| 2022/0174651 | A1* | 6/2022 | Seo | H04W 76/28 |

FOREIGN PATENT DOCUMENTS

| | | |
|---|---|---|
| CN | 108521879 A | 9/2018 |
| CN | 109076493 | 12/2018 |
| CN | 109451847 A | 3/2019 |
| CN | 109451848 A | 3/2019 |
| EP | 2880940 A1 | 6/2015 |
| WO | 2014022179 A1 | 2/2014 |
| WO | 2016144082 A1 | 9/2016 |
| WO | 2018090757 A1 | 5/2018 |
| WO | 2018144873 | 8/2018 |

OTHER PUBLICATIONS

Nokia, Nokia Shanghai Bell, "Paging in NR-U", 3GPP TSG RAN WG2#105 R2-1900522, 3GPP, Feb. 15, 2019.
MediaTek Inc., "Further discussion on paging design", 3GPP TSG RAN WG1 #90bis R1-1718332, 3GPP, Oct. 3, 2017.
Ericsson, "Proposal of UE demodulation requirement for paging reception for eMTC", 3GPP TSG-RAN WG4#80 R4-165688, 3GPP, Aug. 12, 2016.
MediaTek Inc., "RRC Signaling for Light Connection", 3GPP TSG-RAN WG2# 95bis R2-166095, 3GPP, Sep. 30, 2016.
Ericsson, "Additional paging transmission opportunities in NR-U", 3GPP TSG-RAN WG2 #105bis Xi'an, China, Apr. 8-12, 2019, R2-1904734, Chapter 2 Discussion.
Intel Corporation, "Paging enhancement for NR-U", 3GPP TSG-RAN WG2 105bis Xian, China, Apr. 8-12, 2019, R2-1903441, Chapter 2.2. Improving the transmission opportunities for paging.
LG Electronics Inc., "Paging enhancements in NR-U", 3GPP TSG-RAN2 Meeting #105bis Xi'an, China, Apr. 8-12, 2019, R2-1904789, Chapter 2 Discussion.
Vivo, "Remaining Issues of Paging Enhancements for NR-U", 3GPP TSG-RAN WG2 Meeting #105bis Xi'an, China, Apr. 8-12, 2019, R2-1903082, Chapter 2.3. Dynamic PO monitoring termination.
3GPP TS 38.304, "3rd Generation Partnership Project; Technical Specification Group Radio Access Network; NR; User Equipment (UE) procedures in Idle mode and RRC Inactive state (Release 15)", V15.5.0 (Sep. 2019).
Nokia, Nokia Shanghai Bell, "Paging in NR-U",3GPP TSG-RAN WG2 Meeting #105bis,Xian,China,Apr. 8-12, 2019, R2-1903772, Section 2.1.
Nokia, Nokia Shanghai Bell, "Paging in NR-U",3GPP TSG-RAN WG2 Meeting #107bis,Chongqing, China, Oct. 14-18, 2019,R2-1912987, Section 2.1.
Samsung, "Extended PO for Paging in NR-U",3GPP TSG-RAN2 105bis,Xian, China, Apr. 8-Apr. 12, 2019, R2-1903106, Section 2.1-2.4, Fig. 4.
CMCC, "Dynamic paging for NR-U", 3GPP TSG-RAN WG2 Meeting #105bis,Xi'an, China, Apr. 8-Apr. 12, 2019, R2-1904317.
LG Electronics: "Maintenance for Downlink signals and channels", 3GPP Draft; R1-1808482; 3GPP TSG RAN WG1 Meeting #94; Gothenburg, Sweden, Aug. 20-24, 2018(Aug. 2018).
Qiang Li, "TD-LTE, Base station physical layer downlink design and implementation", Information Technology Series, Oct. 15, 2014.
Hong Guang Duan, "TD-SCDMA, The terminal in the system monitors the paging block", China Data Communications, Oct. 29, 2012, See the Abstract.
Xiaoli Chen et al., "RNTI allocation schemes for user equipments in LTE system", Mar. 14, 2013, 2012 8th International Conference on Wireless Communications, Networking and Mobile Computing.

* cited by examiner

METHOD FOR MONITORING PAGING AND APPARATUS USING THE SAME

CROSS-REFERENCE TO RELATED APPLICATION(S)

The present disclosure is a continuation application of U.S. patent application Ser. No. 16/838,013, filed on Apr. 1, 2020, which claims the benefit of and priority to U.S. Provisional Patent Application Ser. No. 62/829,223, filed on Apr. 4, 2019, and U.S. Provisional Patent Application Ser. No. 62/829,214 filed on Apr. 4, 2019, the contents of all of which are hereby fully incorporated herein by reference for all purposes.

FIELD

The present disclosure generally relates to wireless communications, and more particularly, to methods for monitoring paging and apparatuses using the same.

BACKGROUND

Paging is a mechanism that allows a network to reach User Equipments (UEs) operating in the Radio Resource Control (RRC)_IDLE state and the RRC_INACTIVE state, and to notify UEs operating in the RRC_IDLE state, the RRC_INACTIVE state or the RRC_CONNECTED state of system information changes and/or Public Warning System (PWS) indications (e.g., Earthquake and Tsunami Warning System (ETWS)/Commercial Mobile Alert System (CMAS) messages).

However, the current paging monitoring mechanism may not be applicable for the UEs operating in the next generation (e.g., Fifth Generation (5G) New Radio (NR)) wireless communication system.

Therefore, there is a need for paging enhancement in wireless communication systems.

SUMMARY

The present disclosure is directed to methods for monitoring paging and apparatus using the same.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to receive a first Physical Downlink Control Channel (PDCCH) addressed to a first Radio Network Temporary Identifier (RNTI), and stop monitoring a second PDCCH addressed to the same RNTI if the first PDCCH includes a paging stop indicator.

According to another aspect of the present disclosure, a method for monitoring paging is provided. The method is performed by a UE and includes actions of receiving a first PDCCH addressed to a first RNTI, and stopping monitoring a second PDCCH addressed to the same RNTI if the first PDCCH includes a paging stop indicator.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
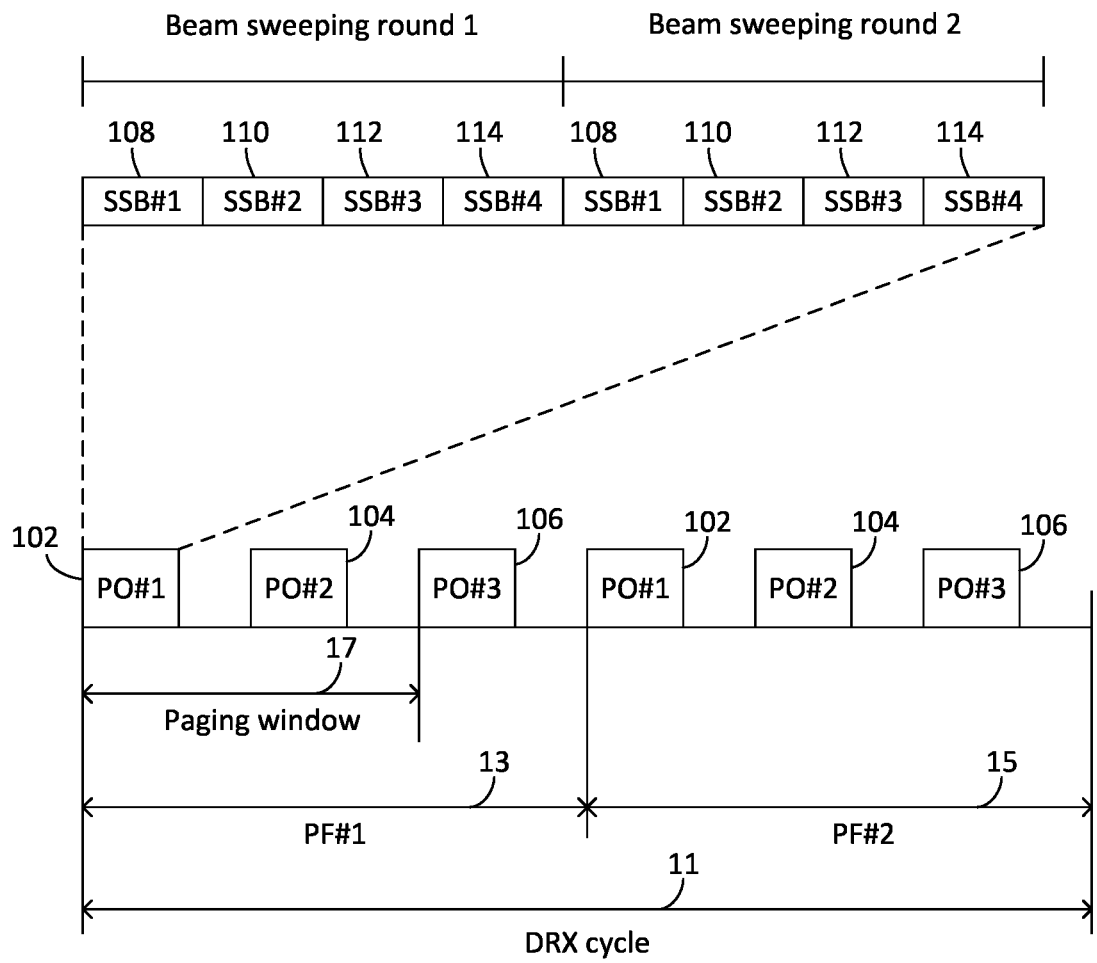
FIG. 1 is a schematic diagram illustrating multiple Paging Occasions (POs) configured for a UE in a Discontinuous Reception (DRX) cycle, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the example figures. However, the features in different implementations may be different in other respects, and thus shall not be narrowly confined to what is illustrated in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer-executable instructions stored on computer-readable medium such as memory or other type of storage devices. For example, one or more microprocessors or general-purpose computers with communication processing capability may be programmed with corresponding executable instructions and perform the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer-readable medium may include but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present disclosure, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, evolved LTE (eLTE) (e.g., LTE connected to a 5GC), NR (often referred to as 5G), and/or LTE-A Pro. However, the scope of the present disclosure should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a Next Generation (ng)-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS may be operable to provide radio coverage to a specific geographical area using a plurality of cells being included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval of a single NR frame, a DL transmission data, a guard period, and an UL transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

For the radio access technology (RAT) deployed on the unlicensed spectrum, devices (e.g., UE, BS, and Access Point (AP)) may follow Listen Before Talk (LBT) mechanism before accessing a channel. The device(s) may perform Clear Channel Assessment (CCA) before performing transmissions on an unlicensed channel. If LBT fails, the device(s) may not access the channel at a determined time.

NR-based unlicensed access (e.g., NR-U) design may also need to take the LBT mechanism into consideration. The deployment scenarios of the NR-based unlicensed access may be but not limited to:

Carrier Aggregation (CA) between the licensed band NR (e.g., for a Primary Cell (PCell)) and the NR-U (e.g., for a Secondary Cell (SCell)). In one implementation, an NR PCell may be connected to a 5GC.

NR-U SCell may include both DL and UL, or DL-only.

Dual Connectivity (DC) between the licensed band LTE (e.g., for a PCell) and the NR-U (e.g., for a Primary secondary cell group (SCG) Cell (PSCell)). In one implementation, an LTE PCell may be connected to an EPC or a 5GC.

Stand-alone NR-U. In one implementation, an NR-U PCell may be connected to a 5GC.

An NR cell with DL in the unlicensed band and UL in the licensed band. In one implementation, an NR-U PCell may be connected to a 5GC.

DC between the licensed band NR (e.g., for a PCell) and the NR-U (e.g., for a PSCell). In one implementation, an NR PCell may be connected to a 5GC.

Among the deployment scenarios, paging enhancement may be required at least in (but not limited to) the stand-alone NR-U case. In addition, based on the NR paging design, a UE may monitor one or more paging channels in a PO per DRX cycle. However, the success rate of the paging transmission may be affected by LBT. For example, if LBT fails on an unlicensed spectrum (e.g., NR-U), and/or if the gNB/cell does not transmit paging DL Control Information (DCI) successfully in the PO for the UE, the latency for the UE to successfully receive the paging messages from a gNB/cell may be increased. In addition, a UE operating in the RRC_IDLE state or in the RRC_INACTIVE state may not successfully receive the paging DCI in the determined PO(s) based on the current Paging Frame (PF) and PO formula.

According to some implementations of the present disclosure, a paging channel may be a PDCCH (or a PDCCH monitoring occasion for paging) where the BS transmits the paging DCI, paging message, DCI format 1_0 with Cyclic Redundancy Check (CRC) scrambled by paging related Radio Network Temporary Identifier (RNTI) (e.g., Paging RNTI (P-RNTI)), short message or paging DCI with/without short message. In some implementations, a paging channel may be a Physical Downlink Shared Channel (PDSCH) where the BS transmits the paging message. In some implementation, a paging channel may be a logical channel (e.g., a Paging Control Channel (PCCH)) via which the UE receives the paging DCI, paging message, DCI format 1_0 with CRC scrambled by paging related RNTI (e.g., P-RNTI), short message or paging DCI with/without short message. In some implementations, a paging channel may be a transport channel (e.g., a Paging Channel (PCH)) via which the UE receives the paging DCI, paging message, DCI format 1_0 with CRC scrambled by paging related RNTI (e.g., P-RNTI), short message or paging DCI with/without short message.

In some implementations, when a Medium Access Control (MAC) entity of a UE needs to receive a PCH for which a PCH assignment has been received by the MAC entity via a PDCCH for a P-RNTI, the MAC entity may attempt to decode a Transport Block (TB) on the PCH as indicated by the PDCCH information. If the TB on the PCH has been successfully decoded by the MAC entity, the MAC entity may deliver the decoded MAC Protocol Data Unit (PDU) to upper layers (e.g., Radio Link Control (RLC) layer, Packet Data Convergence Protocol (PDCP) layer, RRC layer).

In view of this, paging enhancement may be critical for unlicensed spectrum operations. For example, the increase of PO number per DRX cycle, the increase of PO number in a DRX cycle, and/or the increase of PO number out of a DRX cycle may be beneficial to a UE. The additional PO(s) may be in a DRX cycle and/or in a specific Reference Signal (RS) (e.g., a Discovery Reference Signal (DRS)). The UE may receive a PDCCH addressed to the RNTI associated with paging in the (additional) PO(s). The UE may receive the paging message(s) in the PDSCH(s), which is indicated by the PDCCH addressed to the RNTI associated with paging. The RNTI associated with paging may be a P-RNTI. The RNTI associated with paging may be 16-bit in length. The value of RNTI associated with paging may be fixed as 65534 (0xFFFE).

A UE operating in the RRC_IDLE state (which is referred to as an "RRC_IDLE UE") or a UE operating in the RRC_INACTIVE state (which is referred to as an "RRC_I-NACTIVE UE") may receive the paging messages for mobile terminated data, which may be initiated or managed by the 5GC. In some implementations, the RRC_IDLE/RRC_INACTIVE UE may be configured with DRX by Non-Access Stratum (NAS) for receiving CN paging. In some implementations, the RRC_INACTIVE UE may receive the paging messages (e.g., RAN paging) from a Next-Generation Radio Access Network (NG-RAN). In some implementations, the RRC_INACTIVE UE may be configured with DRX by the NG-RAN for RAN paging. In some implementations, the NG-RAN may include an NG-RAN node, which may be either a gNB or an ng-eNB.

In some implementations, an RRC_IDLE/RRC_INAC-TIVE UE may not monitor paging channel(s) continuously. For example, the RRC_IDLE/RRC_INACITVE UE may monitor the paging channel(s) during one or multiple POs per DRX cycle. It is noted that a PO may be a set of PDCCH monitoring occasions and may include multiple time slots (e.g. subframe(s) or OFDM symbol(s)) where paging DCI can be sent by the BS. In some implementations, the value of the DRX cycle may be broadcast in system information for CN paging. For example, the value of the DRX cycle may be UE-specific, which is configured via NAS signaling for CN paging. In another example, the DRX cycle may be UE-specific, which is configured via RRC signaling for RAN paging. In some implementations, if a UE is configured with multiple values for the DRX cycle or multiple DRX cycle configurations, the UE may apply the shortest DRX cycle among the configured DRX cycles. In some implementations, an RRC_CONNECTED UE may monitor the paging channels in any PO signaled in system information. In some implementations, for an RRC_CONNECTED UE having an active Bandwidth Part (BWP) with a common search space configured to monitor the paging channel(s), the UE may monitor the system information (SI) change indication in any PO at least once in a modification period.

In some implementations, the RLC entity of the UE may use a Transparent Mode (TM) for paging, which is one of multiple RLC transmission modes. In some implementations, for paging, the UE may use a logical channel (e.g., Paging Control Channel (PCCH)) between the RLC entity and MAC entity of the UE. The PCCH may be a DL channel that is used for transferring paging information, system information change notifications and indications of ongoing PWS (e.g., ETWS or CMAS) from the network. For example, an RRC_IDLE/RRC_INACTIVE UE may receive the ETWS/CMAS indication(s) in its PO(s). On the other hand, an RRC_CONNECTED UE may receive the ETWS/CMAS indication(s) in any PO. If the UE receives a paging message (or short message, or PDCCH addressed to an RNTI associated for paging) that includes the ETWS/CMAS indication, the UE may trigger the acquisition of system information without delaying until the next modification period. It is noted that the PCCH may map to a PCH, which is a transport channel between the MAC and Physical Layer (PHY) of the UE.

Paging procedures may be affected by LBT failure, resulting in reduced transmission opportunities for paging. In view of this, some mechanisms are provided for enhancing paging opportunities. For example, in some implementations, mechanisms for increasing the time-domain POs (or paging monitoring occasions) are provided. In some implementations, additional PO(s) outside of a DRS (e.g., an NR-U DRS) may be applied. The NR-U DRS may refer to a contiguous burst including the Channel State Information-Reference Signal (CSI-RS) and the Remaining System Information (RMSI)-Control Resource Set(s) (RMSI-CORESET(s)), together with the PDSCH(s) (carrying the RMSI) associated with the Synchronization Signal (SS)/Physical Broadcast Channel (PBCH) Block(s) (SSB(s)), and the SS/PBCH burst set.

In some implementations, for an SSB transmission in the NR-U DRS, the CSI-RS, the RMSI-CORESET(s) and the RMSI-PDSCH(s) may be included in the same contiguous burst when the transmission of the CSI-RS/RMSI are configured. Optionally Other System Information (OSI) and paging may be transmitted in the same DRS if there are available resources.

In some implementations, the UE may determine the PO and PF per DRX cycle to monitor the paging channels based on the PF/PO formula. The BS may provide the required parameters used in the PF/PO formula to the UE. The UE may derive the location of the PO and PF per DRX cycle. In some implementations, the UE may derive one PO in one PF per DRX cycle and monitor the paging channel(s) in one PO per DRX cycle. In some implementations, the PF/PO formula(s) may be modified so that the UE may monitor the paging channel(s) in a DRX cycle more flexibly, i.e., the UE may not be restricted to monitor one PO in one PF per DRX cycle.

In addition, for paging, it may be beneficial to create more opportunities (e.g., time/frequency resources, paging channels, or POs) per DRX cycle for the UE to receive the paging message(s). In some implementations, the BS may configure one or more additional PO locations in the time domain by configuring an extended PO (e.g., a paging window) and/or configuring multiple POs to a UE. In some implementations, for any specified solution(s) for creating additional paging opportunities, the UE power consumption may also be taken into account; to this end, it may be beneficial that the POs are transmitted in close time to or overlap with the RSs.

FIG. 1 is a schematic diagram illustrating at least one PO configured for a UE in a DRX cycle, in accordance with an example implementation of the present disclosure. In the implementation, the UE may be configured with two PFs (PF #1 13 and PF #2 15) per DRX cycle (e.g., DRX cycle 11), where each PF may include one or more POs (e.g., PO #1 102, PO #2 104 and PO #3 106) for paging monitoring. There may be at least one PDCCH monitoring occasion for paging in each PO, and each PDCCH monitoring occasion for paging may be associated with at least one Synchronization Signal/Physical Broadcast Channel Block (SSB) transmitted by the BS. As illustrated in FIG. 1, SSB #1 108, SSB #2 110, SSB #3 112 and SSB #4 114 are transmitted by the BS per beam sweeping round. In addition, the number of the beam sweeping rounds per PO is two (e.g., beam sweeping round 1 and beam sweeping round 2) in this implementation. Therefore, SSB #1 108, SSB #2 110, SSB #3 112 and SSB #4 114 each may be transmitted by the BS twice in a PO (e.g., PO #1 102). In some implementations, the UE may be configured with an extended PO that spans one or more additional POs in the time domain. The extended PO may be considered a paging window. As illustrated in FIG. 1, the paging window 17 spans two POs, specifically PO #1 102 and PO #2 104. Each two adjacent POs may be consecutive or non-consecutive in the time domain.

It should be noted that the implementation in FIG. 1 is for illustrative purposes only, and is not meant to limit the scope of the present disclosure. Any number of POs/PFs/SSBs/beam sweeping rounds/DRX cycles/extended POs may be configured in some other implementations of the present disclosure. For example, the UE may be configured with one or more than one PO per PF/DRX cycle.

In some implementations, the UE may monitor paging channel(s) in at least one PO(s) per DRX cycle. A BS (e.g., gNB) or serving cell may configure the UE to monitor additional PF(s) (e.g., more than one PF) in a DRX cycle. For example, the UE may determine the additional PF(s) based on a revised PF/PO formula (e.g., PF/PO formula A) considering at least one of (but not limited to) the System Frame Number (SFN), the DRX cycle (which is denoted as "T" in the PF/PO formula A), and the total paging frame number in a DRX cycle (which is denoted as "N" in the PF/PO formula A).

In some implementations, based on the revised PF/PO formula (e.g., PF/PO formula A), the UE may determine at least one PO and at least one PF per DRX cycle, where each PO may fall within a PF. In some implementations, the UE may determine a PO associated with a PF, wherein the UE may derive the PF and PO based on the revised PF/PO formula (e.g., PF/PO formula A). The UE may determine a PO which starts before the beginning of a PF, in the duration of a PF, or after/at the end of the PF, wherein the UE may derive the PO and PF based on the revised PF/PO formula. In some implementations, the number of PO(s) per DRX cycle may equal to the number of PFs per DRX cycle. In some implementations, the number of PO(s) per DRX cycle may be Y times the number of PF(s) per DRX cycle, wherein Y is a positive integer.

In some implementations, the UE may monitor the paging in the determined POs based on the revised PF/PO formula (e.g., PF/PO formula A). An example calculation process based on the PF/PO formula A (e.g., including the following Equations (1) to (3)) is illustrated below:

The UE may determine the SFN for a PF based on Equation (1):

$(SFN + PF\_\text{offset}) \bmod T = (T \text{ div } N) \times (UE\_ID \bmod N)$      Equation (1)

The may UE determine the index of PO in a PF based on Equation (2):

$i\_s = \text{floor}(UE\_ID/N) \bmod Ns$      Equation (2)

The SFN of the additional PFs in the DRX cycle (e.g., SFN_o) may be determined by Equation (3):

$SFN\_o = SFN + (T \text{ div } N) \times F$, where $F = 1, 2, 3, \ldots, N-1$      Equation (3)

In some implementations, the UE may reuse the index of PO for the additional PF(s) in the same DRX cycle. For example, the UE may determine the index of PO (e.g., PO #1 102) in the first PF (e.g., PF #1 13) per DRX cycle, and monitor the paging channels in the same index of PO per PF in every PF per DRX cycle (e.g., PO #1 102 in PF #1 13 and PO #1 102 in PF #2 15). In some implementations, the UE may use the index of PO for the additional PF(s) based on pre-defined rules or configuration in a DRX cycle.

In some implementations, the length of a DRX cycle (T) may be (but not limited to) 32, 64, 128, or 256 radio frames. Each DRX cycle may contain N PFs. That is, N is the total paging frame number in a DRX cycle. For example, N may be (but not limited to) T, T/2, T/4, T/8, or T/16, depending on the value of paging search space and/or the RMSI multiplexing pattern. As illustrated in FIG. 1, N is equal to 2.

In some implementations, a PDCCH monitoring occasion for paging may be determined by the UE according to the paging search space and/or particular parameter(s) such as firstPDCCH-MonitoringOccasionOfPO (if configured). In some implementations, the UE may determine the PDCCH monitoring occasions for paging according to a default/non-default association. For example, the default association may refer to the PDCCH monitoring occasions for paging are the same as those for the RMSI (e.g., System Information Block 1 (SIB1)). The non-default association may refer to the case that the PDCCH monitoring occasions for paging are different from those for RMSI. If it is non-default association, the paging search space may not be zero. If it is default association, paging search space may be zero. In Equation (2), the parameter "Ns" may refer to the number of POs for a PF. In some implementations, if it is the default association, Ns may be either 1 or 2, while if it is the non-default association, Ns may be (but not limited to) 1, 2, or 4. In addition, in Equation (1), the parameter "PF_offset" may be an offset used for PF determination, and "UE_ID" may be UE ID modulo 1024 (e.g., 5G-S-Temporary Mobile Subscriber Identity (5G-S-TMSI) mod 1024, or Inactive RNTI (I-RNTI) mod 1024).

As described in Equation (3), the value of SFN_o may be affected by the value of parameter F (which is referred to as "F value"). In some implementations, the UE may receive the configuration of the F value (which is referred to as "F configuration") in SIB1 from the serving/camped-on cell. In some implementations, the serving cell common configuration in SIB1 (e.g., the serving cell common configuration included in the ServingCellConfigCommonSIB Information Element (IE)) may include the F configuration. The common DL configuration in SIB1 (e.g., the common DL configuration may be included in the DownlinkConfigCommonSIB IE) may include the F configuration. In some implementations, the paging control channel configuration (e.g., the paging control channel may be included in the PCCH-Config IE) may include the F configuration. In some implementations, the parameter F may be a cell-specific parameter. In some implementations, if the F configuration is absent, the UE may apply a default value as the F value.

In some implementations, the UE may receive the F configuration in dedicated signaling (e.g., an RRC message, an RRC Reject message, an RRC Reconfiguration message, an RRC Release message, an RRC Release message with suspend configuration or an RRC Release message without suspend configuration). The F configuration may be used to derive the F value. In some implementations, the F configuration may be a UE-specific parameter. For example, the UE may receive the F configuration in an RRC Release message from the serving cell. In some implementations, the F configuration received by the UE from the serving cell may be included in a suspend configuration (e.g., the Suspend-Config IE). If the F configuration is signaled in the suspend configuration, the UE may apply the RAN paging cycle (e.g., indicated by the ran-PagingCycle IE) as the value of parameter T (which is referred to as the "T value") to derive the information used in the F configuration, where the parameter T may indicate a DRX cycle. In some implementations, if the T value is not signaled in the RRC Release message, the UE may apply the T value from the system information to derive the information used in the F configuration.

In some implementations, the UE may derive the F value(s) according to the corresponding F configuration. In some implementations, the F configuration may be a bitmap, where the bitmap may indicate which F value(s) are applied by the UE. In some implementations, the F configuration may be a single value, indicating the maximum F value to apply for the UE. For example, if the maximum F value is 5, the UE may use the F value from 1 to 5 to derive the other/additional PF(s). In some implementations, the F configuration may be a value range. In some implementations, the F configuration may be a structure with choice and bitmap, and the F value may depend on the N value. For example, based on the structure with choice and bitmap, the UE may receive the N value based on the choice structure (e.g., a "CHOICE" type that is defined in Abstract Syntax Notation One (ASN.1)), and then for the N value chosen by the serving cell (or camped-on cell), the UE may receive the F value based on the bitmap. For example, the number of N values may equal to the number of choices. For example, the number of bits in the bitmap corresponding to an N value may equal to the number of F values corresponding to an N value.

In some implementations, the F value may be selected from one or more values of 1, 2, 3, . . . , and N−1, where the UE may acquire the N value based on the DRX cycle (e.g., the T value) and/or other paging-related IE(s) (e.g., the nAndPagingFrameOffset IE) in the PCCH configuration. For example, if the paging cycle is 32, and half T is indicated in a paging-related IE such as the nAndPagingFrameOffset IE, the UE may acquire the N value 16 (e.g., 32/2=16). In some implementations, the F configuration may be indicated by a bitmap (e.g., a (N−1)-bit bitmap). Each bit may correspond to an integer value for the parameter F. In some implementations, the most significant bit may represent whether F equals 1 and the least significant bit may represent whether F equals N−1. For example, if N=5, then a 4-bit bitmap, '1010', may represent that the SFNs of PFs (e.g., SFN_o) are SFN+(T div N) and SFN+(T div N)×3. In other implementations, the most significant bit may represent whether F equals N−1 and the least significant bit may represent whether F equals 1. For example, if N=5, a 4-bit bitmap, '1010', may represent that the SFNs of additional PFs (e.g., SFN_o) are SFN+(T div N)×4 and SFN+(T div N)×2.

An example of the F configuration which is represented based on ASN.1 is illustrated in Table 1.

TABLE 1

| fconfiguration | BIT STRING ((N−1)) |
|---|---|

In some implementations, the UE may acquire the N value implicitly via the DRX cycle and other paging-related IE(s) in the PCCH configuration. In some implementations, the serving cell may explicitly signal via dedicated signaling (e.g., an RRC message, an RRC Reject message an RRC Reconfiguration message, an RRC Release message, an RRC Release message with suspend configuration, or an RRC Release message without suspend configuration) or via system information (e.g., SIB1 and/or other SI) the N value in the size of the bitmap as the maximum N value, which is the maximum T value (e.g., 256). In some implementations, the camped-on cell may explicitly signal via system information the N value in the size of the bitmap as the maximum N value, which is the maximum T value (e.g., 256). Therefore, it is possible that some bits starting from the most significant bit or some bits starting from the least significant bit are not used for the F configuration. These useless bits may be kept as zero.

In some implementations, the F configuration may have a choice structure depending on the N value. This example is illustrated in Table 2. For example, if N equals T/2, the serving/camped-on cell may choose halfT with a (T/2)-bitmap to signal the F configuration. The T value may be the paging cycle (e.g., the paging cycle may be indicated by the defaultPagingCycle IE) signaled from the serving cell to the UE in PCCH configuration via dedicated signaling (e.g., an RRC message, an RRC Reject message, an RRC Reconfiguration message, an RRC Release message, an RRC Release message with suspend configuration, or an RRC Release message without suspend configuration) or via system information (e.g., SIB1, other SI). In some implementations, the T value may be the paging cycle (e.g., defaultPagingCycle IE) that is signaled from the camped-on cell to the UE in a PCCH configuration via system information.

TABLE 2

```
fConfiguration   CHOICE {
       oneT          BIT STRING ((T)),
       halfT         BIT STRING ((T/2)),
    quarterT         BIT STRING ((T/4)),
       oneEighthT    BIT STRING ((T/8)),
       oneSixteenthT BIT STRING ((T/16)),
       },
```

In some implementations, the F configuration may be an integer structure, which ranges from 0, 1, 2, to Fi, where the Fi value may be a fixed, specified, or preconfigured value. In some implementations, the UE may derive the Fi value based on the T value and/or the N value. If the F value is zero, the UE may monitor the paging channel(s) in the PO(s) in one PF. That is, the SFN_o value for the additional PFs may not be required. If the F value is Fi, the UE may monitor the paging channels in the PFs with the system frame numbers of SFN, SFN+(T div N), SFN+(T div N)×2, SFN+(T div N)×3, . . . , and SFN+(T div N)×Fi. In some implementations, the UE may monitor the paging channels in the PFs with the system frame numbers of SFN and SFN+(T div N)×Fi.

In some implementations, if a UE receives the F configuration, the UE may monitor the paging channel(s) in the determined PO(s) in the PF(s) with system frame numbers of SFN and SFN_o (e.g., SFN+(T div N)×F). The UE may not monitor the paging channel(s) in the determined PO(s) in all PFs per DRX cycle. The UE may only monitor the paging channel(s) in the PO(s) in the PFs determined based on the PF/PO formula A and the F configuration per DRX cycle.

In some implementations, the DRX cycle (e.g., T value) may be (but not limited to) the paging cycle value in the suspend configuration of an RRC Release message (e.g., the value of the DRX cycle may be included in the RAN-PagingCycle IE), or the paging cycle value in the SIB1 (e.g., the value of DRX cycle may be included in the defaultPagingCycle IE). It should be noted that the terms "DRX cycle" and "paging cycle" may be interchangeable in some implementations of the present disclosure.

In some implementations, the UE may monitor the paging channel(s) in every PO in every PF per DRX cycle. In some implementations, if the UE receives a paging stop indicator in a (received) PDCCH addressed to an RNTI (e.g., a paging related RNTI, a P-RNTI) in a PO, the UE may stop monitoring the paging channel(s) (e.g., PDCCH monitoring occasion for paging, PDCCH addressed to the same RNTI) in the same PO. In some implementations, if the UE receives a paging stop indicator in a (received) PDCCH addressed to an RNTI (e.g., a paging related RNTI, a P-RNTI) in a PO, the UE may stop monitoring the paging channel(s) (e.g., PDCCH monitoring occasion for paging, PDCCH addressed to the same RNTI) in the subsequent PO(s) in the same PF in which the UE receives the paging stop indicator. In some implementations, if the UE receives a paging stop indicator in a (received) PDCCH addressed to an RNTI (e.g., a paging related RNTI, a P-RNTI) in a PO, the UE may stop monitoring the paging channel(s) (e.g., PDCCH monitoring occasion for paging, PDCCH addressed to the same RNTI) in the subsequent PO(s) in the subsequent PF(s) per DRX cycle. In some implementations, the UE may monitor the paging channel(s) in every determined PO in every determined PF per DRX cycle, where the determined PO(s) and the determined PF(s) may be determined based on a PF/PO formula (e.g., the PF/PO formula A, but not limited to). In some implementations, if the UE receives a paging stop indicator in a (received) PDCCH addressed to an RNTI (e.g., a paging related RNTI, a P-RNTI) in a determined PO, the UE may stop monitoring the paging channels (e.g., PDCCH monitoring occasion for paging, PDCCH addressed to the same RNTI) in the same determined PO, in the subsequent determined PO(s) in the same PF, and/or in the subsequent determined PO(s) in the subsequent determined PF(s) per DRX. In some implementations, the UE may monitor the paging channel(s) in every PO in every determined PF per DRX cycle, where the determined PF(s) may be determined based on a PF/PO formula (e.g., the PF/PO formula A, but not limited to). In some implementations, if the UE receives a paging stop indicator in a (received) PDCCH addressed to an RNTI (e.g., a paging related RNTI, a P-RNTI) in a PO, the UE may stop monitoring the paging channels (e.g., PDCCH monitoring occasion for paging, PDCCH addressed to the same RNTI) in the same PO, in the subsequent PO(s) in the same PF, and/or in the PO(s) in the subsequent determined PF(s) per DRX.

Figure 2:
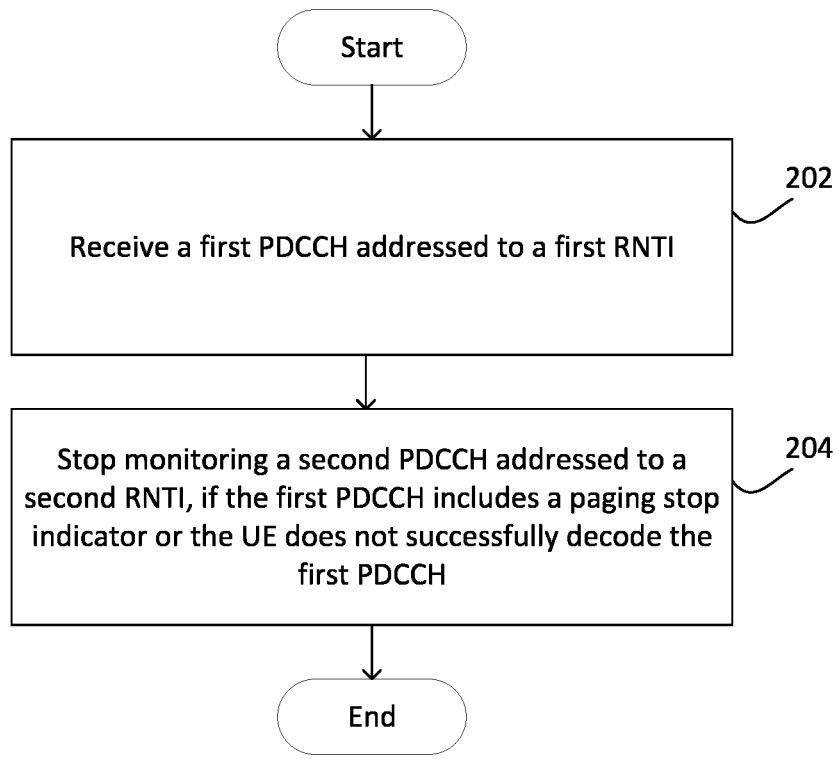
FIG. 2 is a flowchart of a method for monitoring paging, in accordance with an example implementation of the present disclosure.

FIG. 2 is a flowchart of a method for monitoring paging, in accordance with an example implementation of the present disclosure.

In action 202, a UE may receive a first PDCCH addressed to a first RNTI. In some implementations, the first PDCCH addressed to the first RNTI may be a PDCCH on which the UE receives the DCI with CRC scrambled by the first RNTI (e.g., paging DCI, or DCI format 1_0 with CRC scrambled by the first RNTI). In some implementations, the first RNTI may be a P-RNTI.

In action 204, the UE may stop monitoring a second PDCCH addressed to a second RNTI, if the first PDCCH includes a paging stop indicator or the UE does not successfully decode the first PDCCH. The second RNTI may be the same as the first RNTI. In some implementations, the second PDCCH addressed to the second RNTI may be a PDCCH on which the UE receives the DCI with CRC scrambled by the second RNTI (e.g., paging DCI, or DCI format 1_0 with CRC scrambled by the second RNTI). In some implementations, the second RNTI may be a P-RNTI.

In some implementations, the paging stop indicator may be contained in paging DCI. In some implementations, the paging stop indicator may be contained in an RRC message.

In the implementation, the UE may be configured with multiple PDCCH monitoring occasions for paging in a PO within a DRX cycle, where the configured PDCCH monitoring occasions may include a first PDCCH monitoring occasion for the first PDCCH and a second PDCCH monitoring occasion for the second PDCCH. In the implementation, the UE may be configured with multiple (or at least one) PDCCH monitoring occasions for paging associated with a PO within a DRX cycle, where the configured PDCCH monitoring occasions for paging may include a first PDCCH monitoring occasion for the first PDCCH and a second PDCCH monitoring occasion for the second PDCCH. The start of the first PDCCH monitoring occasion may be before the start of the associated PO, during the associated PO, or after/at the end of the associated PO. The start of the second PDCCH monitoring occasion may be before the start of the associated PO, during the associated PO, or after/at the end of the associated PO. In some implementations, the PO with which the first PDCCH monitoring occasion for paging is associated, may be the same as the PO with which the second PDCCH monitoring occasion for paging is associated. In some implementations, the PO with which the first PDCCH monitoring occasion for paging is associated, may be different from the PO with which the second PDCCH monitoring occasion for paging is associated. The PO with which the first PDCCH monitoring occasion for paging is associated, may come before or after the PO with which the second PDCCH monitoring occasion for paging is associated. In some implementations, the PO with which the first PDCCH monitoring occasion for paging is associated may be in (or correspond to) the same DRX cycle as the DRX cycle which the PO with which the second PDCCH monitoring occasion for paging is associated is in (or corresponds to). In some implementations, the PO with which the first PDCCH monitoring occasion for paging is associated may be in (or correspond to) a different DRX cycle from the DRX cycle which the PO with which the second PDCCH monitoring occasion for paging is associated is in (or corresponds to). In some implementations, the PO with which the first PDCCH monitoring occasion for paging is associated may be in (or correspond to) the same PF as the PF which the PO with which the second PDCCH monitoring occasion for paging is associated is in (or corresponds to). In some implementations, the PO with which the first PDCCH monitoring occasion for paging is associated may be in (or correspond to) a different PF from the PF which the PO with which the second PDCCH monitoring occasion for paging is associated is in (or corresponds to). In the implementation, the UE may be configured with multiple (or at least one) PDCCH monitoring occasions for paging associated with a PF within a DRX cycle, where the configured PDCCH monitoring occasions for paging may include a first PDCCH monitoring occasion for the first PDCCH and a second PDCCH monitoring occasion for the second PDCCH. The start of the first PDCCH monitoring occasion may be before the start of the associated PF, during the associated PF, or after/at the end of the associated PF. The start of the second PDCCH monitoring occasion may be before the start of the associated PF, during the associated PF, or after/at the end of the associated PF. In some implementations, the PF with which the first PDCCH monitoring occasion for paging is associated, may be the same as the PF with which the second PDCCH monitoring occasion for paging is associated. In some implementations, the PF with which the first PDCCH monitoring occasion for paging is associated, may be different from the PF with which the second PDCCH monitoring occasion for paging is associated. The PF with which the first PDCCH monitoring occasion for paging is associated, may come before or after the PF with which the second PDCCH monitoring occasion for paging is associated. In some implementations, the PF with which the first PDCCH monitoring occasion for paging is associated may be in (or correspond to) the same DRX cycle as the DRX cycle which the PF with which the second PDCCH monitoring occasion for paging is associated is in (or corresponds to). In some implementations, the PF with which the first PDCCH monitoring occasion for paging is associated may be in (or correspond to) a different DRX cycle from the DRX cycle which the PF with which the second PDCCH monitoring occasion for paging is associated is in (or corresponds to). In the implementation, the UE may be configured with multiple (or at least one) PDCCH monitoring occasions for paging associated with a DRX cycle, where the configured PDCCH monitoring occasions for paging may include a first PDCCH monitoring occasion for the first PDCCH and a second PDCCH monitoring occasion for the second PDCCH. The start of the first PDCCH monitoring occasion may be before the start of the associated DRX cycle, during the associated DRX cycle, or after/at the end of the associated DRX cycle. The start of the second PDCCH monitoring occasion may be before the start of the associated DRX cycle, during the associated DRX cycle, or after/at the end of the associated DRX cycle. In some implementations, the DRX cycle with which the first PDCCH monitoring occasion for paging is associated, may be the same as the DRX cycle with which the second PDCCH monitoring occasion for paging is associated. In some implementations, the DRX cycle with which the first PDCCH monitoring occasion for paging is associated, may be different from the DRX cycle with which the second PDCCH monitoring occasion for paging is associated. The DRX cycle with which the first PDCCH monitoring occasion for paging is associated, may come before or after the DRX cycle with which the second PDCCH monitoring occasion for paging is associated.

Figure 3:
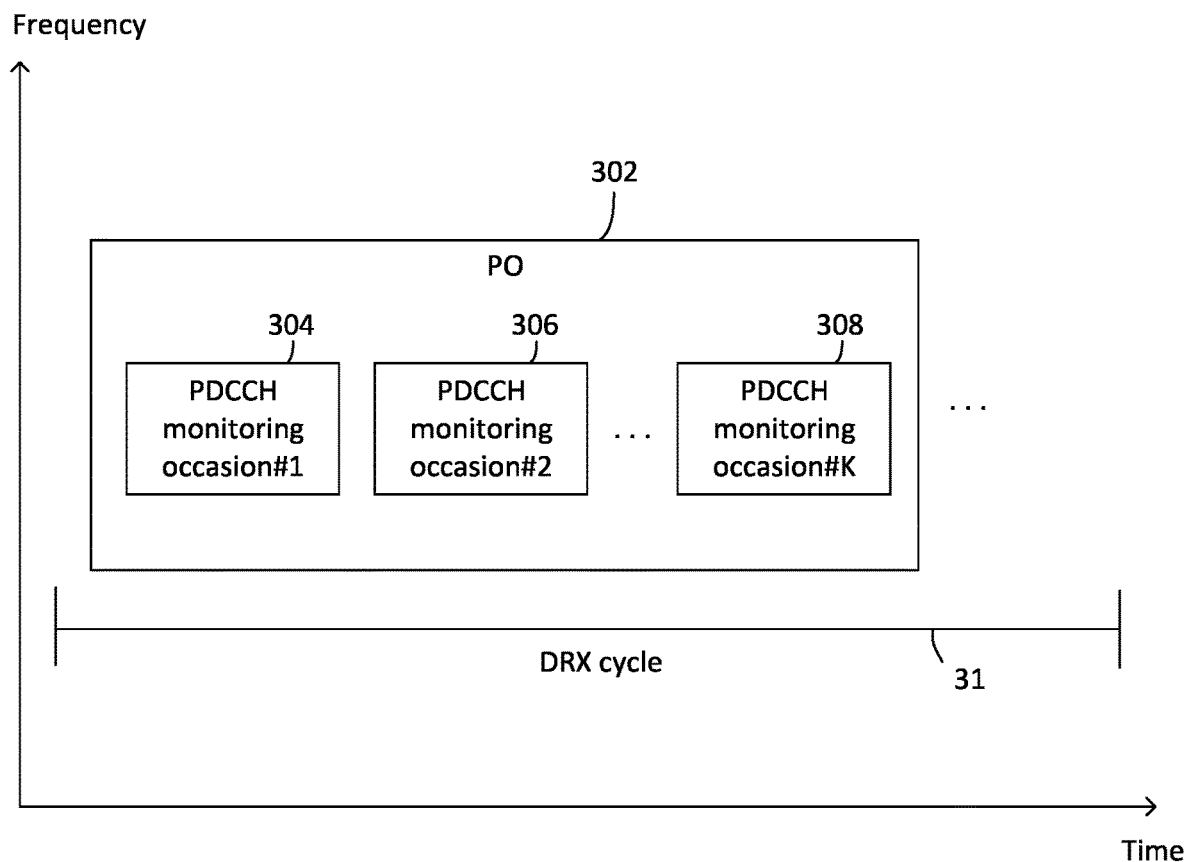
FIG. 3 is a schematic diagram illustrating multiple Physical Downlink Control Channel (PDCCH) monitoring occasions for paging in a PO within a DRX cycle, in accordance with an example implementation of the present disclosure.

FIG. 3 is a schematic diagram illustrating multiple PDCCH monitoring occasions for paging in a PO within a DRX cycle, in accordance with an example implementation of the present disclosure.

As illustrated in FIG. 3, there are K PDCCH monitoring occasions for paging (e.g., PDCCH monitoring occasion #1 304, PDCCH monitoring occasion #2 306, . . . , and PDCCH monitoring occasion #K 308) in PO 302 within DRX cycle 31, where K is a positive integer. In some implementations, K PDCCH monitoring occasions for paging (e.g., PDCCH monitoring occasion #1 304, PDCCH monitoring occasion #2 306, . . . , and PDCCH monitoring occasion #K 308) are associated with PO 302. In some implementations, PO 302 is associated with DRX cycle 31. A UE may receive PDCCH(s)/paging DCI/paging message(s) by monitoring these PDCCH monitoring occasion(s) for paging. For example, the UE may receive a first PDCCH scrambled by a first RNTI by monitoring PDCCH monitoring occasion #1 304 and receive a second PDCCH scrambled by a second RNTI by monitoring PDCCH monitoring occasion #2 306. In addition, PDCCH monitoring occasion #2 306 is subsequent to PDCCH monitoring occasion #1 304 in the time domain. The UE may stop monitoring PDCCH monitoring occasion #2 306 for the second PDCCH in a case that the UE has received a paging stop indicator in the first PDCCH (e.g., by monitoring PDCCH monitoring occasion #1 304)

and that the first RNTI scrambling the first PDCCH is the same as the second RNTI scrambling the second PDCCH.

Each PDCCH monitoring occasion in (or associated with) PO 302 may be associated with an SSB. In some implementations, two or more PDCCH monitoring occasions (e.g., PDCCH monitoring occasion #1 304 and PDCCH monitoring occasion #2 306) in (or associated with) PO 302 may be associated with the same SSB. For example, if PO 302 illustrated in FIG. 3 corresponds to PO #1 102 illustrated in FIG. 1, PDCCH monitoring occasion #1 304 and PDCCH monitoring occasion #2 306 may be associated with the same SSB (e.g., SSB #1 108) received by the UE in PO #1 102. In other implementations, different PDCCH monitoring occasions may be associated with different SSBs.

In some implementations, the UE may stop monitoring the paging channel(s) in (or associated with) the PO(s) in (or associated with) PF(s) per DRX cycle if the UE successfully decodes the PDCCH for paging. In some implementations, the UE may stop monitoring the paging channel(s) in (or associated with) the PO(s) in (or associated with) PF(s) in (or associated with) the same DRX cycle where the UE successfully decodes the PDCCH for paging, if the UE successfully decodes the PDCCH for paging. In some implementations, the UE may stop monitoring the paging channel(s) in (or associated with) the PO(s) in (or associated with) the same PF where the UE successfully decodes the PDCCH for paging, if the UE successfully decodes the PDCCH for paging. In some implementations, the UE may stop monitoring the paging channel(s) in (or associated with) the same PO where the UE successfully decodes the PDCCH for paging, if the UE successfully decodes the PDCCH for paging. For example, if the UE receives a PDCCH addressed to a P-RNTI in a PDCCH monitoring occasion for paging corresponding to an SSB in (or associated with) a PO, then the UE is not required to monitor the subsequent PDCCH monitoring occasion(s) corresponding to that SSB in (or associated with) that PO.

In some implementations, the BS (e.g., gNB) or serving cell may configure a UE to monitor additional PO(s) (e.g., more than one PO(s)) in (or associated with) a PF per DRX cycle. In some implementations, the UE may determine the additional PO(s) based on a formula considering at least (but not limited to) the SFN, the DRX cycle (T), the number of POs for a PF (Ns), and the total paging frame number in a DRX cycle (N).

In some implementations, based on another revised PF/PO formula (e.g., PF/PO formula B), the UE may determine multiple PO(s) in (or associated with) one PF per DRX cycle. An example of calculation process based on the PF/PO formula B (e.g., including the following Equation (4) and (5)) is illustrated below:

The UE may determine the SFN for a PF based on $(SFN+PF\_\text{offset}) \bmod T=(T \text{ div } N)\times(UE\_ID \bmod N)$  Equation (4)

The UE may determine the index of PO based on $i\_s=\text{floor}(UE\_ID/N) \bmod Ns$  Equation (5)

The UE may monitor the paging channel(s) in (or associated with) PO(s) indexed by i_s, i_s+1, i_s+2, . . . , i_s+Ns−1 in (or associated with) the PF per DRX cycle. The POs may be consecutive or non-consecutive. For example, the PO indexed by i_s+1 may be consecutive or non-consecutive to the previous PO indexed by i_s.

The UE may monitor the paging channel(s) in (or associated with) the POs within (or associated with) a PF per DRX cycle. For example, as illustrated in FIG. 1, the UE may determine a PF (e.g., PF #1 13) and multiple POs in (or associated with) this PF (e.g., PO #1 102 and PO #3 106) per DRX cycle. The UE may monitor the paging channel(s) in (or associated with) PO #1 102 and PO #3 106 in (or associated with) PF #1 13 per DRX cycle.

In some implementations, the UE may determine the indexes of POs based on information such as an N_o value, which may be an integer less than or equal to the Ns value. The UE may monitor the paging channel(s) in (or associated with) PO(s) indexed by i_s, i_s+1, i_s+2, . . . , i_s+N_o−1. In other words, N_o may be the (maximum) number of PO(s) in which the UE is required to monitor the paging channel(s). In some implementations, if the UE stops monitoring the paging channel(s) upon successfully decoding the PDCCH for paging or upon receiving the paging stop indicator, the N_o value may be the maximum number of PO(s) in which the UE is required to monitor the paging channel(s).

In some implementations, the serving/camped-on cell may indicate the information (e.g., N_o) with an integer structure via system information (e.g., SIB1, other SI) and/or dedicated signaling (e.g., an RRC message, an RRC Reject message, an RRC Reconfiguration message, an RRC Release message, an RRC Release message with suspend configuration, or an RRC Release message without suspend configuration). In some implementations, the UE may determine an integer value range (e.g., from 0 to N_o) according to the information (e.g., N_o). For example, if N_o is 3, the UE may monitor the paging channel(s) in the PO(s) indexed by i_s, i_s+1, and i_s+2. In some implementations, the UE may monitor the paging channel(s) in these three POs. In some implementations, if the UE successfully decodes the PDCCH for paging or upon receiving the paging stop indicator, the UE may stop monitoring the paging channel(s) in (or associated with) the PO(s) indicated by the information.

In some implementations, the UE may receive a Ns-bit bitmap (e.g., BIT STRING (size(Ns))) or a N_o-bitmap (e.g., BIT STRING (size(N_o))) from the serving/camped-on cell via system information (e.g., SIB1, other SI). In some implementations, the UE may receive a Ns-bit bitmap (e.g., BIT STRING (size(Ns))) or a N_o-bitmap (e.g., BIT STRING (size(N_o))) from the serving cell via dedicated signaling (e.g., an RRC message, an RRC Reject message, an RRC Reconfiguration message, an RRC Release message, an RRC Release message with suspend configuration, or an RRC Release message without suspend configuration). Each bit may correspond to a PO. For example, the most significant bit may correspond to the PO indexed by i_s. The least significant bit may correspond to the PO indexed by i_s+Ns−1 or i_s+N_o−1. In another example, the least significant bit may correspond to the PO indexed by i_s. The most significant bit may correspond to the PO indexed by i_s+Ns−1 or i_s+N_o−1. If all bits in the bitmap are '1', the UE may determine the POs indexed by i_s, i_s+1, . . . , to i_s+Ns−1 (or to i_s+N_o−1), and/or monitor the paging channel(s) in (or associated with) the indexed POs.

In some implementations, the UE may monitor the paging channel(s) in (or associated with) POs with the corresponding bit '1' in the bitmap. In some implementations, the UE may stop monitoring the paging channel(s) in (or associated with) POs with the corresponding bit '1' in the bitmap if the UE successfully decodes the PDCCH for paging in (or associated with) the PO.

In some implementations, the revised PF/PO formula (e.g., PF/PO formula B) may not include the i_s formula. In such a case, the UE may not need to determine the PO index and may always monitor the paging channel(s) in (or associated with) every PO in (or associated with) the determined PF. In addition, the UE may stop monitoring the paging channel(s) in (or associated with) the PO(s) in (or associated with) the determined PF if the UE successfully decodes the PDCCH for paging and/or if the UE receives the paging stop indicator.

In some implementations, the UE may monitor the paging channel(s) in (or associated with) the PO indexed by the i_s value. If the UE cannot successfully decode the PDCCH for paging and/or if the UE cannot receive the paging stop indicator, the UE may start monitoring the paging channels in (or associated with) additional PO(s) in (or associated with) the same PF. The UE may determine the additional PO(s) based on the revised PF/PO formula (e.g., PF/PO formula B with bitmap or integer structure).

In some implementations, if the UE cannot decode the paging (e.g., any combination of paging DCI, paging message(s), paging DCI with short message and paging DCI without short message) in (or associated with) the determined PO based on the PF/PO formula, the UE may continue monitoring the paging channel(s) in (or associated with) the determined PO(s) based on the revised PF/PO formula (e.g., the PF/PO formula A or PF/PO formula B). Furthermore, if the UE cannot decode the paging (e.g., any combination of paging DCI, paging message(s), paging DCI with short message and paging DCI without short message) in (or associated with) determined PO(s) in (or associated with) one PF, the UE may continue monitoring the paging channel(s) in (or associated with) the following (or subsequent) PO(s) in the next (or subsequent) PF. For example, according to FIG. 1, if the UE does not successfully decode the paging in PO #1 in PF #1 13, the UE may continue monitoring the paging channel(s) in the subsequent PO #2 104 in PF #1 13. For another example, according to FIG. 1, if the UE does not successfully decode the paging in PO #1 102 in PF #1 13, the UE may continue monitoring the paging channel(s) in the subsequent PO #1 in PF #2 15. If the UE successfully decodes the paging (e.g., any combination of paging DCI, paging message(s), paging DCI with short message and paging DCI without short message) (or the paging stop indicator), the UE may stop monitoring the paging channel(s) in (or associated with) the PO(s) where the UE successfully decodes the paging (or the paging stop indicator), in (or associated with) the PF(s) where the UE successfully decodes the paging (or the paging stop indicator), and/or in (or associated with) the DRX where the UE successfully decodes the paging (or the paging stop indicator). It should be noted that in some implementations, a PO associated with a PF may start in the PF, before the PF, or after the PF.

In some implementations, a BS (e.g., gNB) or serving cell may configure a UE to monitor multiple PDCCH monitoring occasion(s) for paging in (or associated with) one PO in (or associated with) a PF per DRX cycle. Each PDCCH monitoring occasion for paging may be associated with the corresponding beam (e.g., an SSB). For example, as illustrated in FIG. 1, a PO (e.g., PO #1 102) may include multiple PDCCH monitoring occasion(s) for paging and each PDCCH monitor occasion may be associated with the corresponding beam (e.g., SSB). In some implementations, the BS (e.g., gNB) or serving cell may configure a UE to monitor multiple PDCCH monitoring occasion(s) for paging associated with multiple beam sweeping rounds (e.g., beam sweeping rounds 1 and 2 illustrated in FIG. 1). For example, as illustrated in FIG. 1, in a PO (e.g., PO #1 102), each PDCCH monitoring occasion for paging may take rounds to the corresponding beam (e.g., SSB). For example, at least one PDCCH monitoring occasion for paging or several PDCCH monitoring occasions for paging may be associated with one actual transmitted beam (e.g., SSB). For example, the number of PDCCH monitoring occasions for paging associated with one actual transmitted beam (e.g., SSB #1) in the first beam sweeping round may be the same as or different from the number of PDCCH monitoring occasions for paging associated with the same actual transmitted beam (e.g., SSB #1) in the second beam sweeping round. For example, the number of PDCCH monitoring occasions for paging associated with the first actual transmitted beam (e.g., SSB #1) in the first beam sweeping round may be the same as or different from the number of PDCCH monitoring occasions for paging associated with the second actual transmitted beam (e.g., SSB #2) in the first beam sweeping round. For example, the number of PDCCH monitoring occasions for paging associated with the first actual transmitted beam (e.g., SSB #1) in the first beam sweeping round may be the same as or different from the number of PDCCH monitoring occasions for paging associated with the second actual transmitted beam (e.g., SSB #2) in the second beam sweeping round. For example, the number of PDCCH monitoring occasions for paging associated with one actual transmitted beam (e.g., SSB #1) transmitted at the first time may be the same as or different from the number of PDCCH monitoring occasions for paging associated with the same actual transmitted beam (e.g., SSB #1) transmitted at the second time. For example, the number of PDCCH monitoring occasions for paging associated with the actual transmitted beam (e.g., SSB #1) transmitted at the first time may be the same as or different from the number of PDCCH monitoring occasions for paging associated with the second actual transmitted beam (e.g., SSB #2) which is transmitted at the first time. For example, the number of PDCCH monitoring occasions for paging associated with the first actual transmitted beam (e.g., SSB #1) which is transmitted at the first time may be the same as or different from the number of PDCCH monitoring occasions for paging associated with the second actual transmitted beam (e.g., SSB #2) transmitted at the second time. It is noted that the number of PDCCH monitoring occasion(s) for paging in (or associated with) a PO may be (or may not be) the multiple of the number of actual transmitted beams (e.g., SSBs).

Figure 4:
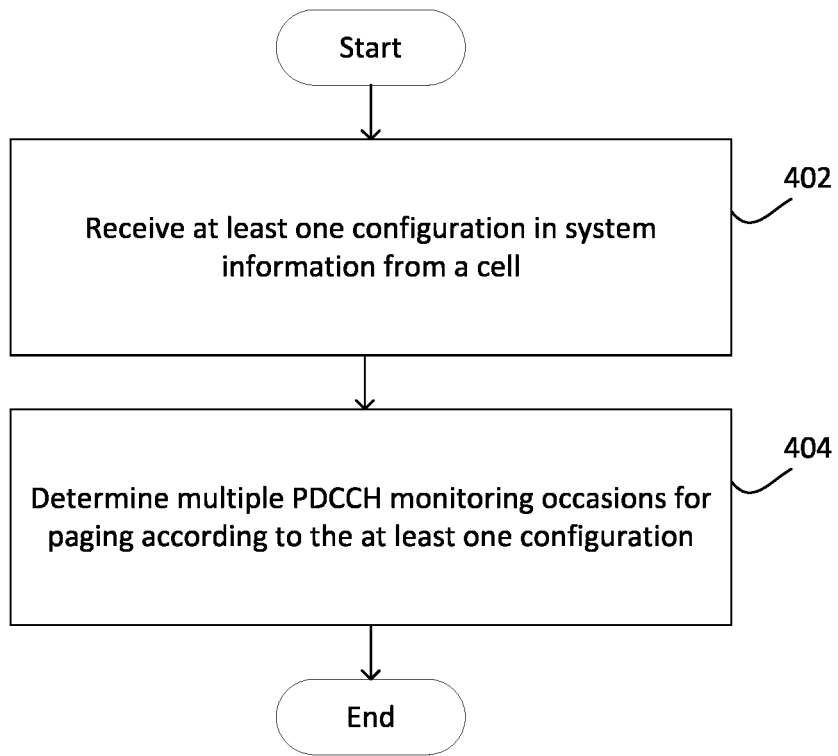
FIG. 4 is a flowchart of a method for monitoring paging in accordance with an example implementation of the present disclosure.

FIG. 4 is a flowchart of a method for monitoring paging in accordance with an example implementation of the present disclosure.

In some implementations, the UE may determine multiple PDCCH monitoring occasions for paging based on a formula considering at least (but not limited to) a first parameter (S) indicating the number of (actual) transmitted SSBs for each beam sweeping round in (or associated with) a PO and a second parameter (X) indicating the number of beam sweeping rounds in the PO, as illustrated in FIG. 4. In some implementations, the UE may determine multiple PDCCH monitoring occasions for paging based on a formula considering at least (but not limited to) a third parameter indicating the index(-ics) of (actual) transmitted SSBs, a fourth parameter indicating the number of PDCCH monitoring occasions for paging associated with an (actual) transmitted SSB, a fifth parameter indicating the number of times the indexed (actual) transmitted SSBs are transmitted, and/or the sixth parameter indicating the number of PDCCH monitoring occasions for paging associated with the indexed (actual) transmitted SSB transmitted at a certain time.

In action 402, a UE may receive at least one configuration in system information from a cell. In some implementations, the at least one configuration may include a PCCH configuration.

In action 404, the UE may determine multiple PDCCH monitoring occasions for paging according to the at least one configuration. For example, the at least one configuration may include a set of parameters including the first parameter (S) indicating a number of transmitted SSBs for each beam sweeping round in the PO and the second parameter (X) indicating a number of beam sweeping rounds in the PO. The UE may determine the number of the PDCCH monitoring occasions for paging in (or associated with) the PO based on a product of the first parameter (S) and the second parameter (X) (e.g., 'S×X'). For example, the at least one configuration may include a set of parameters including a third parameter indicating the index(-ics) of (actual) transmitted SSBs, a fourth parameter indicating the number of PDCCH monitoring occasions for paging associated with an (actual) transmitted SSB, a fifth parameter indicating the number of times the indexed (actual) transmitted SSBs are transmitted, and/or the sixth parameter indicating the number of PDCCH monitoring occasions for paging associated with the indexed (actual) transmitted SSB which is transmitted at a certain time.

In some implementations, a PO may include (or be associated with) a set of 'S×X' consecutive (or non-consecutive) PDCCH monitoring occasions for paging, where the first parameter (S) may be determined according to the ssb-PositionsInBurst IE in SIB1. In some implementations, a PO may include (or be associated with) a set of consecutive (or non-consecutive) PDCCH monitoring occasions for paging, where the number of consecutive (or non-consecutive) PDCCH monitoring occasions for paging may be indicated by the third parameter(s), the fourth parameter(s), the fifth parameter(s) and/or the sixth parameter(s), For example, if the third parameter(s) indicate SSB #1 and SSB #2, the fourth parameter(s) indicate 2 for SSB #1 and 4 for SSB #2, and the fifth parameter(s) indicate 3 for SSB #1 and 6 for SSB #2, the number of set of consecutive (or non-consecutive) PDCCH monitoring occasions for paging may be '2×3+4×6' (i.e., 30). For example, if the third parameter(s) indicate SSB #1 and SSB #2, the fourth parameter(s) indicate 2 for SSB #1 and 4 for SSB #2, and the sixth parameter(s) indicate 1 for SSB #1 transmitted at the first time, 3 for SSB #1 transmitted at the second time, 1 for SSB #2 transmitted at the first and second times, and 3 for SSB #2 transmitted at the third and fourth time, the number of set of consecutive (or non-consecutive) PDCCH monitoring occasions for paging may be '(1+3)+(1+1+3+3)' (i.e., 12).

In some implementations, such as a PO with beam operation on the licensed spectrum (e.g., NR paging), X may equal to 1. In some implementations, such as a PO with beam operation on the unlicensed spectrum (e.g., NR-U paging), X may be an integer equal to or greater than 1. If X=1, the $K^{th}$ PDCCH monitoring occasion for paging in the PO may correspond to the $K^{th}$ transmitted SSB. If X>1, the $K^{th}$ PDCCH monitoring occasion for paging in the PO may correspond to the (K mod S)$^{th}$ transmitted SSB. The same paging message or the same paging DCI (with or without short message) may be repeatedly transmitted by the BS in all transmitted beams per PO. In addition, each PDCCH monitoring occasion may be associated with a beam (e.g., SSB).

In some implementations, a UE may monitor the paging channel(s) in every PDCCH monitoring occasion in (or associated with) the determined PO. If the UE successfully decodes a PDCCH for paging (and/or successfully receives a paging stop indicator), the UE may stop monitoring the paging channels in the PDCCH monitoring occasions in (or associated with) the determined PO where the UE successfully decodes the PDCCH. In some implementations, if the UE successfully decodes a PDCCH for paging (and/or successfully receives a paging stop indicator), the UE may stop monitoring the paging channels in (or associated with) the following PDCCH monitoring occasion(s) for paging in the same DRX where the UE successfully decodes the PDCCH. In some implementations, if the UE successfully decodes a PDCCH for paging (and/or successfully receives a paging stop indicator), the UE may stop monitoring the paging channels in (or associated with) the following PDCCH monitoring occasion(s) for paging in the same PF where the UE successfully decodes the PDCCH. In some implementations, if the UE successfully decodes a PDCCH for paging (and/or successfully receives a paging stop indicator), the UE may stop monitoring the paging channels in the following PDCCH monitoring occasion(s) for paging in (or associated with) the same PO where the UE successfully decodes the PDCCH.

In some implementations, the UE may randomly select the PDCCH monitoring occasion(s) for paging to monitor the paging channel(s) in (or associated with) the determined PO (e.g., when the UE is configured with at least one PDCCH monitoring occasions(s) for paging to monitor the paging channel(s) in (or associated with) the determined PO). The selected PDCCH monitoring occasion(s) for paging in (or associated with) each beam sweeping round in (or associated with) the PO may correspond to the same set of transmitted SSBs. The number of selected PDCCH monitoring occasion(s) for paging in (or associated with) each beam sweeping round in (or associated with) the PO may correspond to the same number of the set of transmitted SSBs. The UE may stop monitoring the paging channels in the PDCCH monitoring occasions if the UE successfully decodes the PDCCH for paging in the PDCCH monitoring occasion(s) for paging corresponding to a transmitted SSB. The UE may stop monitoring the paging channels in the PDCCH monitoring occasions if the UE successfully receives a paging stop indicator in the PDCCH monitoring occasion(s) for paging corresponding to a transmitted SSB. The transmitted SSB may be in (or associated with) the determined PO.

In some implementations, the UE may be preconfigured with the value of the second parameter (which is referred to as 'X' value). In some implementations, the UE may receive the 'X' value via system information (e.g., SIB1, other SI, or PCCH configuration in SIB1) from the serving/camped-on cell. In some implementations, the UE may receive the 'X' value via dedicated signaling (e.g., an RRC message, an RRC Reject message, an RRC Reconfiguration message, an RRC Release message, an RRC Release message with suspend configuration, or an RRC Release message without suspend configuration) from the serving cell. In some implementations, the UE may be preconfigured with the value(s) of the third parameter(s), the value(s) of the fourth parameter(s), the value(s) of the fifth parameter(s), and/or the value(s) of the sixth parameter(s). In some implementations, the UE may receive the value(s) of the third parameter(s), the value(s) of the fourth parameter(s), the value(s) of the fifth parameter(s), and/or the value(s) of the sixth parameter(s) via system information (e.g., SIB1, other SI, or PCCH configuration in SIB1) from the serving/camped-on cell. In some implementations, the UE may receive the value(s) of the third parameter(s), the value(s) of the fourth parameter(s), the value(s) of the fifth parameter(s), and/or the value(s) of the sixth parameter(s) via dedicated signaling (e.g., an RRC message, an RRC Reject message, an RRC Reconfiguration message, an RRC Release message, an RRC Release message with suspend configuration, or an RRC Release message without suspend configuration) from the serving cell.

In some implementations, the PDCCH monitoring occasion(s) for paging associated with the transmitted SSBs in (or associated with) the PO may be in the PF with which the PO is associated, before the PF with which the PO is associated, or after the PF with which the PO is associated.

In some implementations, a UE may start to monitor the paging channels when the paging window begins. For example, as illustrated in FIG. 1, paging window 17 may start at the beginning of one (associated) PO (e.g., PO #1 102) and end at the beginning of another (associated) PO (e.g., PO #2 104).

In some implementations, the paging window 17 may start at (or start before) the PO determined based on a PF/PO formula (e.g., the PF/PO formula A, the PF/PO formula B, or the PF/PO formula(s) considering multiple beam sweeping rounds in a PO).

In some implementations, the UE may receive an offset to the determined PO from the serving/camped-on cell via system information (e.g., SIB1, other SI, or PCCH configuration in SIB1) and/or dedicated signaling (e.g., an RRC message, an RRC Reject message, an RRC Reconfiguration message, an RRC Release message, an RRC Release message with suspend configuration, or an RRC Release message without suspend configuration). The beginning of the paging window 17 may start at the time when the beginning of a determined PO minus the offset to the determined PO occurs, if the offset is a positive value, or may start at the time when the beginning of a determined PO plus the offset to the determined PO occurs, if the offset is a negative value. If the offset is zero, the beginning of the paging window may start at the beginning of a determined PO. It is noted that the determined PO may refer to at least the first PO among PO(s) in a PF.

In some implementations, the paging window may start after the PO determined based on the PF/PO formula (e.g., the PF/PO formula A, the PF/PO formula B, the PF/PO formula considering multiple beam sweeping rounds in a PO). The UE may receive an offset to the determined PO from the serving/camped-on cell via system information (e.g., SIB1, other SI, PCCH configuration in SIB1) and/or dedicated signaling (e.g., an RRC message, an RRC Reject message, an RRC Reconfiguration message, an RRC Release message, an RRC Release message with suspend configuration, or an RRC Release message without suspend configuration). The beginning of the paging window may start at the time when the beginning of a determined PO plus the offset to the determined PO occurs, if the offset is a positive value, or may start at the time when the beginning of a determined PO minus the offset to the determined PO occurs, if the offset is a negative value.

In some implementations, the unit of the offset to the determined PO may be a mini-slot, ms, slot, symbol, subframe, number of POs, number of PFs, PO periodicity, or PF periodicity. The unit of the paging window duration may be a mini-slot, ms, slot, symbol, subframe, number of POs, number of PFs, PO periodicity, or PF periodicity. In some implementations, the paging window may include a set of PO(s) and/or a set of PDCCH monitoring occasions. In some implementations, the paging window may span within a PF, across PF(s), or across DRX cycles.

In some implementations, the UE may receive the configuration of the paging window (e.g., the paging window duration and/or the offset to the determined PO) from the serving/camped-on cell via system information (e.g., SIB1, other SI, PCCH configuration in SIB1) or via dedicated signaling (e.g., an RRC message, an RRC Reject message, an RRC Reconfiguration message, an RRC Release message, an RRC Release message with suspend configuration, or an RRC Release message without suspend configuration).

In some implementations, the UE may monitor the paging channel(s) in the PDCCH monitoring occasion(s) and/or in (or associated with) the determined PO(s) within the (associated) paging window. Within the (associated) paging window, the UE may keep monitoring the paging channel(s) in (associated with) POs or in PDCCH monitoring occasions for paging. In some implementations, the UE may stop monitoring the paging channel(s) within the (associated with) paging window, if the UE successfully decodes the PDCCH for paging. In some implementations, if the UE successfully decodes a PDCCH for paging, the UE may stop monitoring the paging channel(s) within the same (associated with) paging window in which the UE successfully decodes the PDCCH for paging. In some implementations, the UE may stop monitoring paging channel(s) within the (associated) paging window, if the UE successfully receives the paging stop indicator. In some implementations, if the UE successfully receives the paging stop indicator, the UE may stop monitoring the paging channel(s) within the same (associated) paging window in which the UE successfully receives the paging stop indicator.

In some implementations, the serving cell may schedule candidate PO(s) for UEs via dedicated signaling (e.g., an RRC message, an RRC Reject message, an RRC Reconfiguration message, an RRC Release message, an RRC Release message with suspend configuration, or an RRC Release message without suspend configuration). For example, the serving cell may send the RRC Release message with the suspend configuration including the scheduling information for candidate PO(s) to the RRC_CONNECTED UEs, which may transition to the RRC inactive state (e.g., RRC_INACTIVE). For example, the serving cell may send the RRC Release message without the suspend configuration including the scheduling information for candidate PO(s) to the RRC_CONNECTED UEs, which may transition to the RRC idle state (e.g., RRC_IDLE). For example, the serving cell may send the RRC message (e.g., RRC Reconfiguration message) including the scheduling information for candidate PO(s) to the RRC_CONNECTED UEs.

In some implementations, candidate PO(s) may be PO(s) which the UE does not determine based on a PF/PO formula or the PF/PO formula described in the various implementations of the present disclosure. For example, the paging in a DRS may be one variant of a candidate PO.

In some implementations, if the UE does not decode the paging DCI in the PDCCH monitoring occasion(s) for the paging in the PO(s) based on the PF/PO formula or based on the PF/PO formula in the various implementations of the present disclosure, the UE may continue monitoring the paging channel(s) in the candidate PO(s). In some implementations, if the UE cannot decode the paging DCI in the PDCCH monitoring occasion(s) (e.g., in a DRS, in a DRX, or neither in a DRS nor in a DRX), the UE may continue monitoring the paging channel(s) in the candidate PO(s). In some implementations, if the UE does not successfully receive the paging stop indicator in the PDCCH monitoring occasion(s) for paging in the PO(s) based on the PF/PO formula or based on the PF/PO formula in the various implementations of the present disclosure, the UE may continue monitoring the paging channel(s) in the candidate PO(s). In some implementations, if the UE cannot successfully receive the paging stop indicator in the PDCCH monitoring occasion(s) (e.g., in a DRS, in a DRX, or neither in a DRS nor in a DRX) for paging, the UE may continue monitoring the paging channel(s) in the candidate PO(s).

In some implementations, the UE may stop monitoring the paging channel(s) in the candidate PO(s) when the UE completes monitoring the paging channel(s) in candidate PO(s). In some implementations, the UE may stop monitoring the paging channel(s) in the candidate PO(s) when the UE cannot decode the paging (e.g., paging DCI, paging message) in the candidate PO(s). In some implementations, the UE may stop monitoring the paging channel(s) in the candidate PO(s) when the UE successfully decodes the paging (e.g., paging DCI or paging message) in one of the candidate PO(s). In some implementations, the UE may stop monitoring the paging channel(s) in the candidate PO(s) when the UE successfully receives the paging stop indicator in one of the candidate PO(s).

In some implementations, a UE may monitor the paging channel(s) in the PO(s) based on the PF/PO formula or the PF/PO formula in the various implementations of the present disclosure. The UE may monitor the paging channel(s) in the conditional PO(s) if certain criteria is met. For example, if the channel occupancy is high (e.g., the Received Signal Strength Indicator (RSSI) is greater than a threshold), the UE may monitor the paging channel(s) in the conditional PO(s). For example, if the channel occupancy is high (e.g., the RSSI is greater than a threshold) and/or the UE cannot decode the paging (e.g., paging DCI or paging message) in the PO(s) determined by the PF/PO formula, the UE may monitor the paging channel(s) in the conditional PO(s). For example, if the channel occupancy is high (e.g., the RSSI is greater than a threshold) and/or the UE cannot successfully receive the paging stop indicator in the PO(s) determined by the PF/PO formula, the UE may monitor the paging channel(s) in the conditional PO(s). In some implementations, the threshold may be pre-defined or pre-configured. In some implementations, the UE may receive the threshold via a broadcast by the serving/camped-on cell (e.g., via SIB1, via other SI). In some implementations, the UE may receive the threshold transmitted by the serving/camped-on cell via dedicated signaling (e.g., RRC message, RRC Reject message, RRC Reconfiguration message, RRC Release message, RRC Release with suspend message, RRC Release without suspend message).

In some implementations, the UE may receive the configuration of the conditional PO(s) in the system information and/or dedicated signaling (e.g., an RRC message, an RRC Reject message, an RRC Reconfiguration message, an RRC Release message, an RRC Release message with suspend configuration, or an RRC Release message without suspend configuration) from the serving/camped-on cell. The configuration of the conditional PO(s) may include at least one of the thresholds (e.g., RSSI threshold), the RSSI measurement configuration, and the time/frequency resource information for the conditional PO(s).

In some implementations, the serving/camped-on cell may indicate to the UE whether the UE should follow the enhanced paging monitoring method(s) described in one or more of various implementations of the present disclosure. For example, the enhanced paging monitoring method may be, but not limited to, the method illustrated in FIG. 2. In some implementations, the enhanced paging monitoring method may be performed by the UE based on at least one of the following revised PF/PO formulas: (1) the PF/PO formula A, (2) the PF/PO formula B, (3) the PF/PO formula that considers at least one of the number of multiple beam sweeps in a PO, the paging window including a set of PO(s), the candidate PO(s) and the additional PO(s) (e.g., conditional PO(s)). In some implementations, the UE may perform the paging monitoring without using a normal PF/PO formula that has been defined in, for example, the 3GPP Technical Specification (TS) 38.304 v15.5.0, if the UE applies the enhanced paging monitoring method. Instead, the UE may use the revised PF/PO formula(s) to perform the paging monitoring.

In some implementations, if the UE receives a triggering indicator from the serving/camped-on cell, the UE may perform (or continue to perform) the paging monitoring (e.g., monitoring paging, monitoring the PDCCH monitoring occasions for paging, monitoring the paging DCI, monitoring the paging message) based on the enhanced paging monitoring method. In some implementations, if the UE receives a paging stop indicator from the serving/camped-on cell, the UE may stop monitoring the paging channel(s) (e.g., paging DCI, PDCCH monitoring occasions for paging, paging message) based on the enhanced paging monitoring method. In some implementations, the UE may monitor the paging DCI based on the PF/PO formula when (or only when) it receives the paging stop indicator. It is noted that the serving/camped-on cell may indicate the triggering indicator and/or paging stop indicator to the UE via system information (e.g., SIB1 and/or other SI) and/or dedicated signaling (e.g., an RRC message, an RRC Reject message, an RRC Reconfiguration message, an RRC Release message, an RRC Release message with suspend configuration, or an RRC Release message without suspend configuration).

In some implementations, the UE may stop monitoring the paging (e.g., the paging DCI, paging message, paging stop indicator) in PO(s) or in PDCCH monitoring occasion(s) for paging when the UE successfully decodes (or receives) the paging (e.g., paging DCI, paging message, paging stop indicator). In some implementations, the UE may stop monitoring in the PDCCH monitoring occasions in (or associated with) PO(s) in the same PF, in the PDCCH monitoring occasions in (or associated with) PO(s) in the same DRX cycle, in the PDCCH monitoring occasions in (or associated with) PO(s) in the DRS, in PO(s) in the same PF, in PO(s) in the same DRX cycle, in PO(s) in the DRS, or in the PDCCH monitoring occasions(s) corresponding to the same beam in the same PO, wherein the UE may successfully decode (or receive) the paging (e.g., paging DCI, paging message, paging stop indicator) in the corresponding PO(s), DRX cycle, PF and/or DRS, when the UE successfully decodes (or receives) the paging (e.g., paging DCI, paging message, paging stop indicator). In some implementations, the UE may successfully decode (or receive) the PDCCH including (associated with) the paging when (but not limited to) (1) the UE receives a paging message including its UE identity (ID), (2) the UE receives a paging message without its UE ID, (3) the UE receives paging DCI (e.g., a DCI format 1_0 with CRC scrambled by P-RNTI), and/or (4) the UE receives a short message.

In some implementations, the UE may stop monitoring the paging channel(s) in PO(s) or in PDCCH monitoring occasion(s) for paging if the UE cannot decode the paging (e.g., paging DCI or paging message) in a determined PO or in a conditional PO and if the channel occupancy is below a threshold (e.g., the RSSI is below a threshold). For example, if the UE cannot decode the paging (e.g., paging DCI or paging message) in a determined PO or in a conditional PO and the channel occupancy is below a threshold (e.g., the RSSI is below a threshold), the UE may stop monitoring the paging channel(s) in PO(s) in the DRS in which the determined PO or conditional PO occurs. For example, if the UE cannot decode the paging (e.g., paging DCI or paging message) in a determined PO or in a conditional PO and the channel occupancy is below a threshold (e.g., the RSSI is below a threshold), the UE may stop monitoring the paging channel(s) in PO(s) in the PF in which the determined PO or conditional PO occurs. For example, if the UE cannot decode the paging (e.g., paging DCI or paging message) in a determined PO or in a conditional PO, and the channel occupancy is below a threshold (e.g., the RSSI is below a threshold), the UE may stop monitoring the paging channel(s) in PO(s) in the DRX cycle in which the determined PO or conditional PO occurs. For example, if the UE cannot decode the paging (e.g., paging DCI or paging message) in a determined PO or in a conditional PO and the channel occupancy is below a threshold (e.g., the RSSI is below a threshold), the UE may stop monitoring the paging channel(s) in the PDCCH monitoring occasion(s) associated with the same corresponding beam in the same PO.

In some implementations, the BS (e.g., gNB) or serving/camped-on cell may stop transmitting the paging (e.g., paging DCI or paging message) for a UE in the following PO (or PDCCH monitoring occasions for the paging) in the DRX cycle if the BS (e.g., gNB) or serving/camped-on cell transmits the paging successfully in one PO (or PDCCH monitoring occasions for the paging). In some implementations, the BS (e.g., gNB) or serving/camped-on cell may stop transmitting the paging (e.g., paging DCI or paging message) for a UE in the following PO (or PDCCH monitoring occasions for the paging) in the same PF if it transmits the paging successfully in a PO (or PDCCH monitoring occasion(s) for the paging). In some implementations, the BS (e.g., gNB) or serving/camped-on cell may stop transmitting the paging (e.g., paging DCI or paging message) for a UE in the following PO (or PDCCH monitoring occasions for the paging) in the same DRS if it transmits the paging successfully in a PO (or PDCCH monitoring occasions for the paging). In some implementations, the BS (e.g., gNB) or serving/camped-on cell may stop transmitting the paging (e.g., paging DCI, paging message) for a UE in the following PDCCH monitoring occasions for the paging corresponding to the same beam in the DRX cycle if it transmits the paging successfully in one PO (or PDCCH monitoring occasions for the paging).

In some implementations, the UE may be configured with the number of PO(s) (e.g., n) in which the UE monitors the paging channel(s). The UE may receive the configuration (e.g., the number of PO(s)) broadcast from the camped-on/serving cell via SIB1 or other SI. The UE may receive the configuration (e.g., the number of PO(s)) transmitted from the camped-on/serving cell via dedicated signaling (e.g., RRC message, RRC Reject message, RRC Reconfiguration message, RRC Release message, RRC Release with suspend configuration message, RRC Release without suspend configuration message). The UE may monitor the paging channel(s) in at least 'n' PO(s). In some implementations, the UE may monitor the paging channel(s) in at most 'n' PO(s). In some implementations, the UE may randomly choose the 'n' PO(s) per DRX cycle. In some implementations, the UE may monitor the paging channel(s) in the first 'n' PO(s) starting from the determined PO based on the PF/PO formula (e.g., PF/PO formula A or PF/PO formula B). In some implementations, the UE may determine the number of PO(s) (e.g., n) where the UE monitors the paging channel(s). In some implementations, the UE may be configured with the number of PDCCH monitoring occasion(s) for paging (e.g., n') in which the UE monitors the paging channel(s). The UE may receive the configuration (e.g., the number of PDCCH monitoring occasion(s) for paging) broadcast from the camped-on/serving cell via SIB1 or other SI. The UE may receive the configuration (e.g., the number of PDCCH monitoring occasion(s) for paging) transmitted from the camped-on/serving cell via dedicated signaling (e.g., RRC message, RRC Reject message, RRC Reconfiguration message, RRC Release message, RRC Release with suspend configuration message, RRC Release without suspend configuration message). The UE may monitor the paging channel(s) in at least 'n' PDCCH monitoring occasion(s) for paging (e.g., within (or associated with) a DRX cycle, within (or associated with) a DRS, within (or associated with) a PF, within (or associated with) a PO). In some implementations, the UE may monitor the paging channel(s) in at most 'n' PDCCH monitoring occasion(s) for paging (e.g., within (or associated with) a DRX cycle, within (or associated with) a DRS, within (or associated with) a PF, within (or associated with) a PO). In some implementations, the UE may randomly choose the 'n' PDCCH monitoring occasion(s) for paging (e.g., within (or associated with) a DRX cycle, within (or associated with) a DRS, within (or associated with) a PF, within (or associated with) a PO). In some implementations, the UE may monitor the paging channel(s) in the first 'n' PDCCH monitoring occasion(s) for paging (e.g., within (or associated with) a DRX cycle, within (or associated with) a DRS, within (or associated with) a PF, within (or associated with) a PO) starting from the determined PO based on the PF/PO formula (e.g., PF/PO formula A or PF/PO formula B). In some implementations, the UE may determine the number of PDCCH monitoring occasion(s) for paging (e.g., within (or associated with) a DRX cycle, within (or associated with) a DRS, within (or associated with) a PF, within (or associated with) a PO) where the UE monitors the paging channel(s).

In some implementations, the UE may monitor the paging channel(s) in every PO, in every PDCCH monitoring occasion for paging, or in every PDCCH monitoring occasion corresponding to the same beam (e.g., SSB), if these PO(s) and PDCCH monitoring occasion(s) for paging are configured by the BS (e.g., gNB) or serving/camped-on cell.

In some implementations, if the UE cannot decode the paging (e.g., paging DCI or paging message) in the determined PO (or PDCCH monitoring occasions for paging), the UE may go to sleep and wake up to monitor the paging channel(s) in the next PO within the same DRX cycle. In some implementations, if the UE cannot decode the paging (e.g., paging DCI or paging message) in the determined PO (or PDCCH monitoring occasions for paging), the UE may remain awake and monitor the paging channel(s) in the next PO(s) within the same DRX cycle.

In some implementations, if the UE does not receive the configuration or parameters for the configuration of PDCCH monitoring occasion for paging (e.g., configuration for the PF/PO formula A, configuration for the PF/PO formula B, configuration for PF/PO formula considering the multiple beam sweeping round in a PO, configuration for PF/PO formula considering the paging window, configuration for the candidate PO, configuration for the conditional PO, or any configuration in the presented implementations of the present disclosure) other than the normal PF/PO formula (e.g., defined in the 3GPP TS 38.304 v15.5.0), the UE may monitor the paging channel(s) in PO(s) or in the PDCCH monitoring occasion(s) for paging based on this normal PF/PO formula. In some implementations, if the UE receives the configuration for PDCCH monitoring occasion(s) for paging other than the normal PF/PO formula (e.g., defined in the 3GPP TS 38.304 v15.5.0) but with an absence of parameter value(s) in the configuration, the UE may monitor the paging channel(s) in PO(s) and/or PDCCH monitoring occasion(s) for paging based on the existing formula (e.g., the normal PF/PO formula defined in the 3GPP TS 38.304 v15.5.0).

In some implementations, the UE may transmit the information regarding its capability to support a specific UE behavior (e.g., performing the enhanced paging monitoring method as described in one or more of various implementations of the present disclosure) to the BS (e.g., gNB) or serving cell. In some implementations, the UE may transmit the information regarding its capability to support the unlicensed RAT (e.g., NR-U) to the BS (e.g., gNB) or serving cell. In some implementations, the UE may transmit the information via an RRC message (e.g., UE Capability Information) to the BS (e.g., gNB) or serving cell. Upon the BS (e.g., gNB) or serving cell receives the information (e.g., UE Capability Information) indicating that the UE supports the specific UE behavior and/or the unlicensed RAT, the BS (e.g., gNB) or serving cell may configure the UE to perform the supported UE behavior and/or unlicensed RAT.

In some implementations, the UE may monitor the paging channel(s) in a DRS based on the paging configuration. The UE may monitor the paging channel(s) in a DRX cycle based on the paging configuration used for the PF/PO formula calculation.

In some implementations, if the UE cannot decode the PDCCH for paging (e.g., the UE does not decode the PDCCH for paging successfully) in the determined PO(s) in a DRX cycle, the UE may continue monitoring the paging channel(s), either in PO(s) in the DRS or in PO(s) in the same DRX cycle. The PDDCH for paging may be the PDDCH addressed to an RNTI associated for paging.

In some implementations, if the UE cannot decode the PDCCH for paging in the determined PO(s) in a DRX cycle, the UE may continue monitoring the paging channel(s) in PO(s) in different DRX cycles.

In some implementations, if the UE cannot decode the PDCCH for paging in the determined PO(s) in a DRX cycle, the UE may start to monitor the paging channel(s) in PO(s) in the DRS. Meanwhile, the UE may also monitor the paging channel(s) in the determined PO(s) in the same DRX cycle.

In some implementations, if the UE cannot decode the PDCCH for paging in the determined PO(s) in a DRX cycle, the UE may skip monitoring the paging channel(s) in PO(s) in the same DRX cycle but continue monitoring the paging channel(s) in PO(s) in different DRX cycles.

In some implementations, if the UE cannot decode the PDCCH for paging in the determined PO(s) in a DRX cycle, the UE may wake up to monitor the paging channel(s) in PO(s) in the DRS and the paging channel(s) in the determined PO(s) in a DRX cycle. The DRX cycle may be the same as or different from the DRX cycle in which the UE cannot decode the PDCCH for paging in the determined PO(s).

In some implementations, if the UE successfully decodes the PDCCH for paging in a PO in a DRS before the next determined PO in the same DRX cycle, the UE may skip monitoring the paging channel(s) in the following determined PO(s) in the same DRX cycle.

In some implementations, if the UE successfully decodes the PDCCH for paging in a PO in a DRX cycle, the UE may skip monitoring the paging channel(s) in the following determined PO(s) in the same DRX cycle.

In some implementations, if the UE successfully decodes the PDCCH for paging in one or more POs (which may be in a DRX cycle or in a DRS), the UE may stop monitoring the paging channel(s) in the PO(s) in the DRS, if the UE is configured to monitor the paging channel(s) in PO(s) in the DRS.

In some implementations, if the UE successfully decodes the PDCCH for paging in a PDCCH monitoring occasion for paging in a determined PO based on a PF/PO formula in a DRX cycle, the UE may not monitor the paging channel(s) in PO(s) in a DRS, where the PO(s) in the DRS may come after the determined PO but falls within the same DRX cycle.

In some implementations, before the UE successfully decodes the PDCCH for paging in a determined PO based on a PF/PO formula in a DRX cycle, the UE may monitor the paging channel(s) in a PO in the DRS.

In some implementations, the UE may receive an indication (e.g., paging stop indicator) in a DRS from a serving/camped-on cell, indicating whether the UE needs to monitor the paging channel(s) outside the DRS. The indication (e.g., paging stop indicator) may be carried in an RMSI, OSI, or paging DCI in a DRS. In some implementations, the indication (e.g., paging stop indicator) may have a Boolean structure or an enumerate structure. For example, if the UE receives the indication (e.g., paging stop indicator) that indicates the UE to monitor the paging channel(s) outside the DRS, the UE may monitor the paging channel(s) outside the DRS in the PO(s) calculated by the PF/PO formula. It is noted that the PF/PO formula may include any paging enhancement (e.g., a PF/PO formula considering at least one of: (1) multiple PFs in a DRX cycle, (2) multiple POs in one PF in a DRX cycle, (3) multiple beam sweeping rounds in a PO, and (4) a paging monitoring window). The paging monitoring window may refer to a time duration, in which the UE performs the paging monitoring. The UE may receive the parameters from the BS, where the parameters are required for the UE to calculate the PF/PO formula. Based on the PF/PO formula, the UE may derive the time/frequency resources for the PDCCH monitoring occasions. The UE may monitor the PDDCH monitoring occasions for paging and receive (or decode) the PDCCH addressed to an RNTI associated for paging sent by the BS.

In some implementations, if the UE cannot decode the PDCCH for paging in the determined POs based on the PF/PO formula in a DRX cycle, the UE may enter the RRC_CONNECTED state. For example, the UE may send an RRC message (e.g., an RRC (Connection) Resume Request message or an RRC (Connection) Setup Request message) to the serving cell (e.g., if the UE is in an RRC_CONNECTED state), BS (e.g., a gNB) or the camped-on cell (e.g., if the UE is in an RRC_IDLE/RRC_INACTIVE state). The RRC message may include a cause value. For example, the cause value may indicate a 'PO failure'. In some implementations, the BS (e.g., a gNB) or serving cell may reply to the UE with new PF/PO parameters in an RRC message (e.g., an RRC Release message with a suspend configuration, an RRC Release message without a suspend configuration, an RRC Release message, an RRC Setup message or an RRC Reconfiguration message). The new PF/PO parameters may be used for expanding a paging monitoring window.

In some implementations, the BS (e.g., a gNB) or serving/camped-on cell may adjust the paging parameters and inform the UE of the parameter adjustment via system information (e.g., via System Information Block 1 (SIB1) and/or via OSI). The UE may apply the adjusted paging parameters in the system information to determine the updated PO(s), based on the PF/PO formula with the adjusted paging parameters, in a DRX cycle or in a DRS. The UE may monitor the paging channel(s) in the PO(s), either in the DRS or in the DRX cycle, determined based on the adjusted paging parameters.

In some implementations, if the UE cannot decode the PDCCH for paging in the determined PO(s) based on the PF/PO formula in a DRX cycle, the UE may perform a cell reselection procedure to reselect a new cell to camp on.

In some implementations, if the UE cannot decode the PDCCH for paging in the determined PO(s) based on the PF/PO formula in a DRX cycle, the UE may bar itself from camping on the cell that transmits the paging message(s) (or the PDCCH for paging in the determined PO(s)). For example, when the UE performs the cell reselection procedure, the UE may bar itself from reselecting to camp on the cell that transmits the paging message(s) (or the PDCCH for paging in the determined PO(s)). In some implementations, the barring time may be X seconds, where X is a positive real number. In some implementations, the UE may start a timer if the UE cannot decode the PDCCH for paging in the PO(s) determined based on the PF/PO formula in a DRX cycle. Within the X seconds (i.e., when the timer is running), the UE may not reselect to such a cell. Upon the timer expiry, the UE may reselect such cell or consider such cell as a candidate cell for cell reselection. In other implementations, if the UE cannot decode the PDCCH for paging in the PO(s) determined based on the PF/PO formula in a DRX cycle, the UE may bar itself from camping on any cell of an unlicensed spectrum (e.g., NR-U), where the barring time may be X seconds.

In some implementations, if the UE cannot decode the PDCCH for paging in the determined PO(s) in a DRX cycle, the UE may report paging failure information to a cell. It is noted that such cell may be an SCell, a reselected cell as the outcome of cell reselection procedure which the UE may perform after the UE cannot decode the PDCCH for paging in the determined PO(s) in a DRX cycle, a cell transmitting the PDCCH for paging, or a cell transmitting the paging message(s). In some implementations, the UE may report the paging failure information to an SCell (e.g., via Physical Uplink Control Channel (PUCCH) resources) if the UE is configured with CA. In some implementations, the UE may report the paging failure information to a PSCell (e.g., via PUCCH resources, via RRC signaling, via Signaling Radio Bearer 3 (SRB3), via PUSCH resources) in an SCG if the UE is configured with multi-connectivity. In some implementations, the UE may report the paging failure information to a reselected cell after performing cell reselection. In some implementations, if a cell (e.g., SCell, PSCell or reselected cell) receives the paging failure information, Xn/X2 interface signaling may be required for the cell to exchange/forward the DL data to the UE. In some implementations, the cell to which the UE reports the paging failure information may (not) be the cell which configures the UE with parameters to derive the PO(s)/PF in the DRX cycle for paging monitoring. In some implementations, the cell to which the UE reports the paging failure information may (not) be the cell from which the UE may decode or receive the PDCCH for paging.

In some implementations, the UE may simultaneously monitor the paging channel(s) in the determined PO(s) in a DRX cycle and monitor the paging channel(s) in PO(s) in DRS.

In some implementations, the UE may monitor the PDCCH for paging in determined PO(s), which falls within an Active Time of a DRX cycle. The Active Time may refer to the time duration when a DRX-related timer (e.g., drx-onDurationTimer, drx-InactivityTimer, drx-RetransmissionTimerDL or drx-RetransmissionTimerUL) is running. The UE may monitor the PDCCH for paging in PO(s) in a DRS in the non-Active Time of a DRX cycle. In some implementations, the paging monitoring in a DRS may not initiate the DRX-related timer (e.g., drx-InactivityTimer, drx-RetransmissionTimerDL or drx-RetransmissionTimerUL). The UE may wake up only for monitoring PDCCH paging in the DRS and go back to the non-Active Time after the DRS reception.

In some implementations, in the Active Time of a DRX cycle, the UE may monitor the PDCCH occasion for paging in the PO(s) in a DRS, while in the non-Active Time of the DRX cycle, the UE may not monitor the PDCCH occasion for paging in the PO(s) in the DRS.

In some implementations, the Active Time may be extended when one or more predetermined conditions are satisfied. The predetermined conditions may include, but are not limited to, the detection of LBT failure, the detection of PDCCH decoding failure, and the channel occupancy ratio being above a threshold. In some implementations, the UE may be configured by the serving cell via RRC message(s) with a timer related to the predetermined condition(s). If the predetermined condition corresponding to the timer is satisfied (e.g., the channel occupancy ratio is above a threshold), the UE may extend or start the timer. In some implementations, if the UE fails to decode the PDCCH (e.g., the PDCCH for paging), the UE may extend or start the timer. When the timer is running, it may be deemed as the Active Time. In some implementations, if the timer expires but other DRX-related timers (e.g., drx-InactivityTimer, drx-RetransmissionTimerDL, and drx-RetransmissionTimerUL) are still running, the UE may be in the Active Time of a DRX cycle.

In some implementations, the UE may receive a paging configuration via dedicated signaling (e.g., an RRC message, an RRC Reconfiguration message, an RRC Release message, an RRC Release message with a suspend configuration, or an RRC Release message without a suspend configuration).

In some implementations, the parameters in a paging configuration may include at least one of a System Frame Number (SFN), a DRX cycle (T), the total paging frame number in a DRX cycle (N), the number of POs for a PF (Ns), the number of actual transmitted SSBs (S), a beam sweeping round (X), the paging DCI, a short message, an indicator (e.g., a paging stop indicator) for the UE to stop/inactivate/deactivate paging monitoring, an indicator for the UE to stop/inactivate/deactivate paging monitoring in a network (e.g., stop/inactivate/deactivate a paging monitoring procedure for (a cell of) a RAN), and an indicator for the UE to begin/activate paging monitoring in a network (e.g., begin/activate/initiate a paging monitoring procedure for a RAN).

In some implementations, when a UE switches from the cell of a first RAN to camp on the cell of a second RAN for performing paging monitoring/reception in the second RAN, the UE may regard a first paging configuration for the first RAN as an invalid paging configuration and notify the first RAN with a validity indicator. In some implementations, the validity indicator may be a Boolean indicator. For example, the validity indicator may be set to '1' to notify (the cell of) the first RAN that the UE regards the first paging configuration for (the cell of) the first RAN as a valid paging configuration (e.g., by storing the first paging configuration for (the cell of) the first RAN) after the UE performs a network switch to camp on the cell of the second RAN. Conversely, the validity indicator may be set to '0' or 'absent' to notify (the cell of) the first RAN that the UE regards the first paging configuration for the first RAN as an invalid paging configuration (e.g., by removing or clearing or releasing the first paging configuration for (the cell of) the first RAN) after the UE performs a network switch to camp on the cell of the second RAN. In some implementations, the UE may inform a network of a network switch (e.g., to switch to camp on a cell of another network) via a 2-step Random Access (RA) procedure, a 4-step Random Access (RA) procedure or small data transmission procedure. For example, the UE may send the validity indicator to the network in Msg A of a 2-step RA procedure, e.g., on the Physical Uplink Shared Channel (PUSCH) of the Msg A. For another example, the UE may send the validity indicator to the network via a message (e.g., RRC signaling, RRC message, RRC Resume Request message, RRC System Information Request message) and/or resources (e.g., a PUSCH and/or a PUCCH) based on small data transmission mechanism. For another example, the UE may send the validity indicator to the network in Msg 3 of a 4-step RA procedure, e.g., on the PUSCH of the Msg 3, in the RRC message (e.g., RRC System Information Request message, RRC Resume Request message, RRC Setup Request message) carried by Msg 3.

In some implementations, the UE may receive the RRC state transition information from the camped-on/serving cell of a first RAN via dedicated signaling (e.g., an RRC message, an RRC Reconfiguration message, an RRC Release message, an RRC Release message with a suspend configuration, an RRC Release message without a suspend configuration, an RRC Resume message, or an RRC Setup message). Once the UE transitions from the current RRC state of the first RAN to the target RRC state of the second RAN, the UE may apply a second paging configuration for the second RAN to monitor PO(s) for (the cell of) the second RAN. That is, the second paging configuration may be applied by the UE in the target RRC state of the second RAN to monitor at least one PO for (the cell of) the second RAN. In some implementations, the target RRC state of the second RAN may be an RRC_IDLE state of the second RAN, an RRC_INACTIVE state of the second RAN, or an RRC_CONNECTED state of the second RAN. The second paging configuration may be associated with (the cell of) the second RAN. The UE may apply the second paging configuration for paging monitoring and reception in (the cell of) the second RAN. In some implementations, the UE may receive the second paging configuration together with the RRC state transition information in the same dedicated signaling from (the cell of) the first RAN. In some implementations, the UE may receive the second paging configuration together with the RRC state transition information in the same dedicated signaling from (the cell of) the second RAN.

In some implementations, a paging configuration of a RAN may include at least one of: the parameter(s) used for a PF/PO formula, the parameter(s) for the UE to derive the radio resources (e.g., the time and/or frequency domain resources) to receive paging messages and/or a PDCCH addressed to an RNTI associated for paging (e.g., P-RNTI). The UE may receive paging DCI which is scrambled by the P-RNTI on the PDCCH, the parameter(s) for the UE to begin/activate paging monitoring in a network, and the parameter(s) for the UE to stop/inactivate/deactivate paging monitoring in a network. For example, the second paging configuration (e.g., for (the cell of) the second RAN) may include at least one of: the parameter(s) for the UE to derive locations of radio resources (based on which the UE may monitor the at least one second PO for the second RAN), the parameter(s) for activating/initiating/starting a paging monitoring procedure in (the cell of) the second RAN, and the parameter(s) for inactivating/stopping/deactivating the paging monitoring procedure in (the cell of) the second RAN.

In some implementations, the UE may receive the paging configuration from the camped-on/serving cell via system information (e.g., SIB1, OSI, or Downlink Common Configuration in SIB1). In some implementations, the UE may determine the PDCCH monitoring occasion(s) for paging based on the PF/PO formula and/or the paging configuration. The UE may determine the PO(s) and PF based on the PF/PO formula and/or the paging configuration. The UE may monitor the PDCCH monitoring occasion(s) for paging in a PO. A PO may include at least one PDCCH monitoring occasion for paging. For a UE, there may be at least one PO per DRX cycle. If a UE detects a PDCCH addressed to a P-RNTI within the PDCCH monitoring occasion for paging, the UE may further decode and/or receive the paging DCI (e.g., which is scrambled by the P-RNTI). In some implementations, the paging DCI may include at least one of a short message, a short message indicator, a time/frequency resource (e.g., a PDSCH resource) to receive the paging messages, an indicator to begin monitoring the PDCCH monitoring occasion(s) for paging in another network, an indicator (e.g., paging stop indicator) to stop monitoring the PDCCH monitoring occasion(s) for paging in the current network, and an indicator to switch to another network (e.g., if the UE is equipped with Multi-SIM) to monitor the PDCCH monitoring occasion(s) for paging.

In some implementations, the paging configuration may be invalid upon the UE's state transition (e.g., from the RRC_CONNECTED state to the RRC_INACTIVE state, from the RRC_CONNECTED state to the RRC_IDLE state, or from the RRC_INACTIVE state to the RRC_IDLE state). For example, the UE may receive and apply the paging configuration when operating in the RRC_INACTIVE state, and after the UE transitions to the RRC_IDLE state, the RRC_IDLE UE may not apply the paging configuration used in the RRC_INACTIVE state. For example, the UE may clear or remove the paging configuration upon state transition, so that the paging configuration used in the RRC_INACTIVE state may become invalid for the RRC_IDLE UE. The RRC_IDLE UE may apply the pre-configured paging configuration or the paging configuration broadcast by a camped-on cell (e.g., an NR cell or an EUTRA cell) for paging monitoring.

In some implementations, the paging configuration may be valid upon the UE's state transition (e.g., from the RRC_CONNECTED state to the RRC_INACTIVE state, from the RRC_CONNECTED state to the RRC_IDLE state, or from the RRC_INACTIVE state to the RRC_IDLE state). For example, the UE may receive and apply the paging configuration in the RRC_INACTIVE state. After the UE transitions to the RRC_IDLE state, the RRC_IDLE UE may apply the paging configuration used in the RRC_INACTIVE state and store the paging configuration upon state transition. In such a case, the paging configuration used in the RRC_INACTIVE state may be valid for the RRC_IDLE UE. If the RRC_IDLE UE has a preconfigured paging configuration or receives a paging configuration broadcast from a camped-on cell (e.g., an NR cell or an EUTRA cell), the UE may apply the preconfigured or received paging configuration rather than the paging configuration used in the NR RRC_INACTIVE state.

In some implementations, the paging configuration may be invalid upon the UE's inter-RAT state transition (e.g., from the NR RRC_INACTIVE state to the EUTRA RRC_IDLE state, from the EUTRA RRC_INACTIVE state to the NR RRC_IDLE state, from the NR RRC_IDLE state to the EUTRA RRC_IDLE state, from the EUTRA RRC_IDLE state to the NR RRC_IDLE state). In some implementations, an EUTRA RRC_INACTIVE UE may camp on an EUTRA cell connected to the 5GC. For example, the UE may receive and apply the paging configuration in the NR RRC_INACTIVE state. After the UE transitions to the EUTRA RRC_IDLE state, the RRC_IDLE UE may not apply the paging configuration used in the NR RRC_INACTIVE state. For example, the UE may clear, remove or release the paging configuration used in the NR RRC_INACTIVE state. The paging configuration used in the NR RRC_INACTIVE state may become invalid for the EUTRA RRC_IDLE UE. The EUTRA RRC_IDLE UE may apply a preconfigured paging configuration or a paging configuration broadcast from a camped-on cell (e.g., an EUTRA cell) for paging monitoring.

In some implementations, the paging configuration may be valid upon the UE's inter-RAT state transition (e.g., from the NR RRC_INACTIVE state to the EUTRA RRC_IDLE state, from the EUTRA RRC_INACTIVE state to the NR RRC_IDLE state, from the NR RRC_IDLE state to the EUTRA RRC_IDLE state, from the EUTRA RRC_IDLE state to the NR RRC_IDLE state). The EUTRA RRC_INACTIVE UE may camp on an EUTRA cell connected to the 5GC. For example, the UE may receive and apply the paging configuration in the NR RRC_INACTIVE state. After the UE transitions to the EUTRA RRC_IDLE state, the RRC_IDLE UE may still apply the paging configuration used in the NR RRC_INACTIVE state. The EUTRA RRC_IDLE UE may store the paging configuration used in the NR RRC_INACTIVE state, where the paging configuration used in the NR RRC_INACTIVE state may be valid for the EUTRA RRC_IDLE UE. In some implementations, if the EUTRA RRC_IDLE UE has the preconfigured EUTRA paging configuration or receives the paging configuration broadcast from a camped-on cell (e.g., an EUTRA cell), the UE may apply the preconfigured or received paging configuration rather than the paging configuration used in the NR RRC_INACTIVE state.

In some implementations, if the UE reselects a cell on a different band, the UE may store the paging configuration for the cell in a previous band. When the UE reselects a cell in the previous band, the UE may directly apply the stored paging configuration for the previous band. For example, the UE may be configured with one or more paging parameters for a cell on an unlicensed band (e.g., an NR-U cell). If the UE reselects a cell on a licensed band regardless of the frequency prioritization, the UE may store the paging parameter(s) for the cell on the unlicensed band. When the UE reselects a cell on the unlicensed band again, the UE may apply the stored paging parameter(s) for paging monitoring on the reselected cell on the unlicensed band. In another example, the UE may be configured with the paging parameter(s) for a cell on a licensed band (e.g., an NR cell or an EUTRA cell). If the UE reselects a cell on an unlicensed band regardless of the frequency prioritization, the UE may store the paging parameter(s) for the cell on the licensed band. When the UE reselects a cell on the licensed band again, the UE may apply the stored paging parameter(s) for paging monitoring on a reselected cell on the licensed band.

In some implementations, if the UE reselects a cell on a different band, the UE may clear or remove the paging configuration for the cell in a previous band. In such a case, the paging configuration may become invalid. When the UE reselects a cell in the previous band, the UE may use a preconfigured paging configuration for the previous band or apply the paging configuration broadcast from a camped-on cell in the previous band. For example, the UE may be configured with one or more paging parameters for a cell on an unlicensed band (e.g., an NR-U cell). If the UE reselects a cell on a licensed band regardless of the frequency prioritization, the UE may clear, release or remove the paging parameters for the cell on the unlicensed band. When the UE reselects a cell on the unlicensed band again, the UE may apply the preconfigured paging parameters for the cell on an unlicensed band or the paging configuration broadcast from the reselected cell on the unlicensed band for paging monitoring/reception on the reselected cell on the unlicensed band. In another example, the UE may be configured with the paging parameter(s) for a cell on a licensed band (e.g., an NR cell or an EUTRA cell). If the UE reselects a cell on an unlicensed band regardless of the frequency prioritization, the UE may release, remove or clear the paging parameter(s) for the cell on the licensed band. When the UE reselects a cell on the licensed band again, the UE may apply the preconfigured paging parameter(s) for the reselected cell on the licensed band or the paging configuration broadcast from the reselected cell on the licensed band to perform paging monitoring/reception on the reselected cell on the licensed band.

In some implementations, if the UE reselects a cell on a different band, the UE may store the paging configuration used for the cell in a previous band for a time period. For example, the UE may start a timer when it reselects a cell on a different band. Before the timer expires, if the UE reselects a cell in the previous band, the UE may directly apply the stored paging configuration associated with the timer for the previous band. In some implementations, before the timer expires, if the UE reselects the same cell as the previous serving cell on the previous band, the UE may directly apply the stored paging configuration. Conversely, if the UE reselects a cell on the previous band which is different from the previous serving cell on the previous band, the UE may not directly apply the stored paging configuration. In some implementations, before the timer expires, if the UE reselects any cell on the previous band, the UE may directly apply the stored paging configuration. The UE may stop (or restart) the timer when the UE reselects the same cell on the previous band as the previous serving cell on the previous band. In some implementations, the UE may stop (or restart) the timer when the UE reselects any cell on the previous band. When the timer expires, the UE may release, clear or remove the stored paging configuration. If the timer expires and the UE reselects a cell on the previous band, the UE may use the preconfigured paging configuration for the previous band or apply the paging configuration broadcast from a camped-on cell on the previous band.

In some implementations, a UE may be configured with one or more paging parameters for a cell on an unlicensed band (e.g., an NR-U cell). If the UE reselects a cell on a licensed band regardless of the frequency prioritization, the UE may start a timer and store the paging configuration used for the cell on the unlicensed band. Before the timer expires, if the UE reselects the same cell on an unlicensed band as the previous serving cell on the unlicensed band, the UE may apply the stored paging configuration. Before the timer expires, if the UE reselects a different cell on an unlicensed band from the previous serving cell on the unlicensed band, the UE may stop (or restart) the timer and clear/remove/ release the paging configuration. In some implementations, before the timer expires, if the UE reselects a different cell on an unlicensed band from the previous serving cell on the unlicensed band, the UE may keep the timer running and store the paging configuration. In some implementations, before the timer expires, if the UE reselects any cell on an unlicensed band, the UE may apply the stored paging configuration associated with the timer. The UE may stop (or restart) the timer when the UE reselects the same cell on the unlicensed band as the previous serving cell on the unlicensed band. In some implementations, the UE may stop (or restart) the timer when the UE reselects any cell on the unlicensed band. If the timer expires, the UE may release, clear or remove the stored paging configuration associated with the timer. If the timer expires and the UE reselects a cell on the unlicensed band, the UE may use the preconfigured paging configuration for the unlicensed band or apply the broadcast paging configuration from a camped-on cell on the unlicensed band.

In some implementations, the terms "paging," "paging channel," and "PO" may be used interchangeably.

In some implementations, the paging DCI may be carried by PDCCH(s) in a CORESET. In some implementations, the paging DCI may be the PDCCH addressed to the RNTI associated for paging.

In some implementations, the PDCCH(s) addressed to an RNTI associated with paging may include (or be) the DCI format 1_0 with Cyclic Redundancy Check (CRC) scrambled by a P-RNTI.

In some implementations, a PDSCH may carry the paging message.

In some implementations, the RRC_CONNECTED UE, RRC_INACTIVE UE, and RRC_IDLE UE may each apply the operations, actions or procedures described in disclosed implementations.

In some implementations, when the UE monitors the paging channel(s), the UE may further receive the paging (e.g., the PDCCH addressed to an RNTI associated with paging, the paging DCI and/or paging message(s)) in the PO(s).

In some implementations, if the UE monitors the paging channel(s), the UE may further decode the paging (e.g., the PDCCH addressed to an RNTI associated for paging, paging DCI(s), paging message(s)) in the PO (s).

In some implementations, the paging DCI may be the DCI with the CRC scrambled by a P-RNTI or by a common RNTI (e.g., Cell Radio Network Temporary Identifier (C-RNTI)), which indicate the information related to the paging. The information related to the paging may be the time/frequency resource (e.g., PDSCH resources) for the UE to receive the paging message(s). In some implementations, the information related to paging may be the ETWS/CMAS notification and/or system information change.

In some implementations, a DRS window length may be 5 milliseconds (ms), and a DRX cycle may be 32, 64, 128 or 256 radio frames.

In some implementations, the network may provide the system information via dedicated signaling to an RRC_CONNECTED UE using an RRC Reconfiguration message. For example, the RRC_CONNECTED UE may be configured with an active BWP with a common search space configured to monitor the system information or paging.

In some implementations, the PDCCH addressed to an RNTI associated with paging (on which the UE successfully decodes) may indicate the paging information including the UE ID or without the UE ID.

In some implementations, the operations, actions or procedures described in the disclosed implementations may be determined based on a per-Public Land Mobile Network (PLMN) basis, a per-Non-Public Network (NPN) basis, a per-Stand-alone NPN (SNPN) basis, or a per-Closed Access Group (CAG) basis. For example, each UE belonging to a different PLMN/NPN/CAG/SNPN may be configured with different parameter(s) for receiving a PDCCH addressed to an RNTI associated for paging in PO(s) in a DRS/DRX.

In some implementations, a UE may receive the paging (e.g., the PDCCH addressed to an RNTI associated with paging, the paging DCI and/or the paging message(s)) in the initial BWP and/or the active BWP.

In some implementations, the UE may receive an indicator (e.g., a paging stop indicator) that indicates whether to stop monitoring the paging channel(s). The UE may receive the indicator via system information (e.g., the SIB1 and/or OSI) from a serving/camped-on cell. The UE may receive the indicator via dedicated signaling (e.g., an RRC message, an RRC Reconfiguration message, an RRC Release message, an RRC Release message without a suspend configuration, or an RRC Release message with a suspend configuration) from a serving/camped-on cell. In some implementations, the UE may receive the indicator in the PDCCH addressed to an RNTI associated with paging, the paging DCI or the paging message(s). The indicator may have a Boolean structure or an enumerate structure. In some implementations, if the indicator does not instruct the UE to stop monitoring the paging channel(s), the UE may continue to monitor the paging channel(s).

Figure 5:
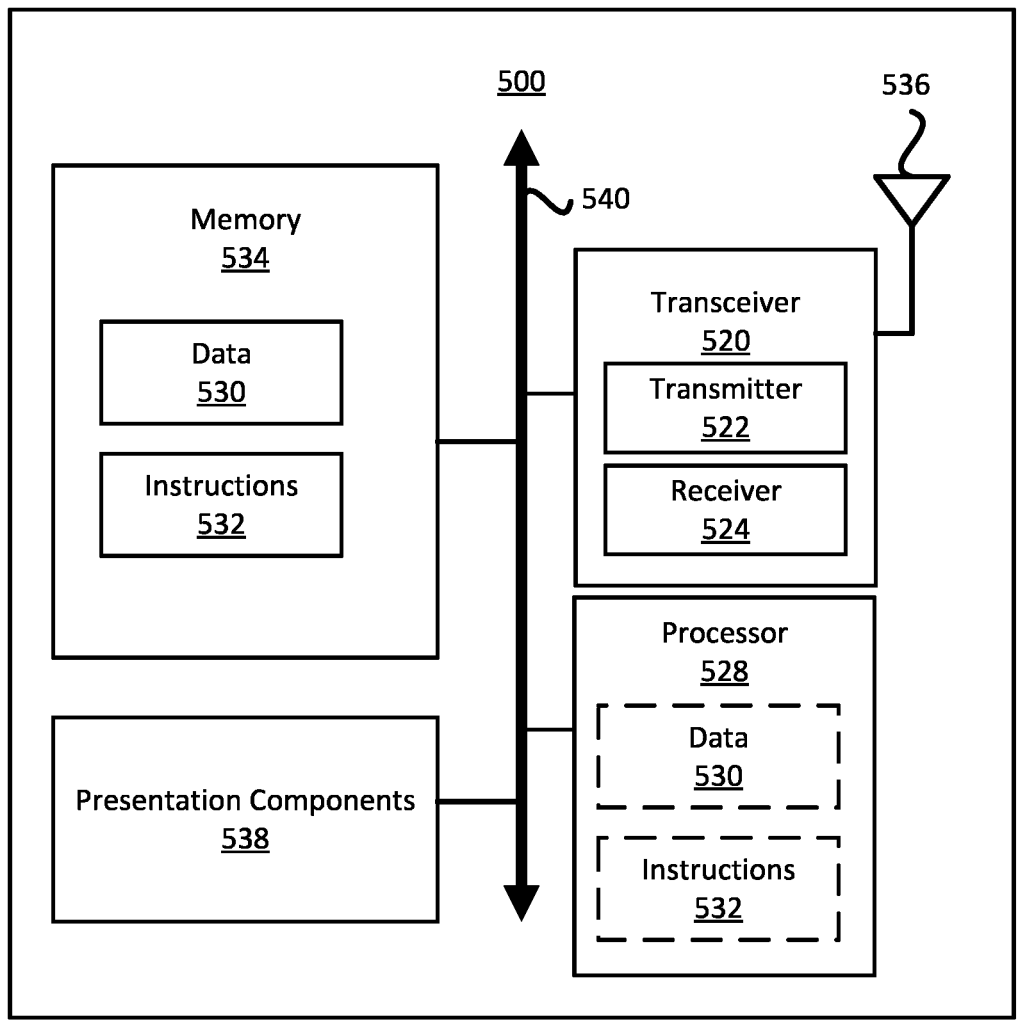
FIG. 5 is a block diagram illustrating a node for wireless communication, in accordance with various aspects of the present disclosure.

FIG. 5 is a block diagram illustrating a node 500 for wireless communication, in accordance with the present disclosure. As illustrated in FIG. 5, the node 500 may include a transceiver 520, a processor 528, a memory 534, one or more presentation components 538, and at least one antenna 536. The node 500 may also include an RF spectrum band module, a BS communications module, a network communications module, and a system communications management module, Input/Output (I/O) ports, I/O components, and power supply (not explicitly illustrated). Each of these components may be in communication with each other, directly or indirectly, over one or more buses 540. In one implementation, the node 500 may be a UE or a BS, or any other apparatus of wireless communications that performs various functions described herein, for example, with reference to FIGS. 1 through 4.

The transceiver 520 has a transmitter 522 (e.g., transmitting/transmission circuitry) and a receiver 524 (e.g., receiving/reception circuitry) configured to transmit and/or receive time and/or frequency resource partitioning information. In some implementations, the transceiver 520 may be configured to transmit in different types of subframes and slots including, but are not limited to, usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile (and non-volatile) media and removable (and non-removable) media. By way of example, and not limitation, computer-readable media may comprise computer storage media and communication media. Computer storage media may include both volatile (and non-volatile) media and removable (and non-removable) media implemented according to any method or technology for storage of information such as computer-readable instructions, data structures, program modules or data.

Computer storage media may include RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media may not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 534 may include computer-storage media in the form of volatile and/or non-volatile memory. The memory 534 may be removable, non-removable, or a combination thereof. Examples of memory include solid-state memory, hard drives, optical-disc drives, etc. As illustrated in FIG. 5, the memory 534 may store computer-readable, computer-executable instructions 532 (e.g., software codes) that are configured to, when executed, cause the processor 528 to perform various functions described herein, for example, with reference to FIGS. 1 through 4. Alternatively, the instructions 532 may not be directly executable by the processor 528 but be configured to cause the node 500 (e.g., when compiled and executed) to perform various functions described herein.

The processor 528 (e.g., having processing circuitry) may include a Central Processing Unit (CPU), a microcontroller, an ASIC, an intelligent hardware device, or any combination thereof configured to perform the disclosed functions. The processor 528 may include memory. The processor 528 may process the data 530 and the instructions 532 received from the memory 534, and information received via the transceiver 520, the base band communications module, and/or the network communications module. The processor 528 may also process information to be sent to the transceiver 520 for transmission via the antenna 536, to the network communications module for transmission to a CN.

One or more presentation components 538 may present data to a person or other devices. Examples of presentation components 538 may include a display device, speaker, printing component, vibrating component, etc.

From the above description, it is clear that various techniques may be used for implementing the concepts described in the present disclosure without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present disclosure is not limited to the particular implementations described, but many rearrangements, modifications, and substitutions are possible without departing from the scope of the present disclosure.

What is claimed is:

1. A user equipment (UE), comprising:
one or more non-transitory computer-readable media storing computer-executable instructions; and
at least one processor coupled to the one or more non-transitory computer-readable media, and configured to execute the computer-executable instructions to:
receive a first Physical Downlink Control Channel (PDCCH) addressed to a Radio Network Temporary Identifier (RNTI); and
stop monitoring a second PDCCH addressed to the same RNTI if the first PDCCH includes a paging stop indicator.

2. The UE of claim 1, wherein:
the UE is configured with a plurality of PDCCH monitoring occasions for paging in a Paging Occasion (PO) within a Discontinuous Reception (DRX) cycle, and
the plurality of PDCCH monitoring occasions for paging includes a first PDCCH monitoring occasion for the first PDCCH and a second PDCCH monitoring occasion for the second PDCCH.

3. The UE of claim 2, wherein the at least one processor is further configured to execute the computer-executable instructions to:
receive, from a cell, at least one configuration in system information; and
determine the plurality of PDCCH monitoring occasions for paging according to the at least one configuration.

4. The UE of claim 3, wherein the at least one processor is further configured to execute the computer-executable instructions to:
determine a number of the plurality of PDCCH monitoring occasions for paging in the PO based on the at least one configuration.

5. The UE of claim 3, wherein the at least one configuration includes a Paging Control Channel (PCCH) configuration.

6. The UE of claim 2, wherein the second PDCCH monitoring occasion is subsequent to the first PDCCH monitoring occasion in time domain.

7. The UE of claim 1, wherein the at least one processor is further configured to execute the computer-executable instructions to:
stop monitoring the second PDCCH if the UE does not successfully decode the first PDCCH.

8. The UE of claim 1, wherein the paging stop indicator is contained in paging Downlink Control Information (DCI).

9. The UE of claim 1, wherein the paging stop indicator is contained in a Radio Resource Control (RRC) message.

10. The UE of claim 1, wherein the first PDCCH and the second PDCCH are associated with a same Synchronization Signal/Physical Broadcast Channel Block (SSB).

11. A method performed by a user equipment (UE), the method comprising:
receiving a first Physical Downlink Control Channel (PDCCH) addressed to a first Radio Network Temporary Identifier (RNTI); and
stopping monitoring a second PDCCH addressed to the same RNTI if the first PDCCH includes a paging stop indicator.

12. The method of claim 11, wherein:
the UE is configured with a plurality of PDCCH monitoring occasions for paging in a Paging Occasion (PO) within a Discontinuous Reception (DRX) cycle, and the plurality of PDCCH monitoring occasions for paging includes a first PDCCH monitoring occasion for the first PDCCH and a second PDCCH monitoring occasion for the second PDCCH.

13. The method of claim 12, further comprising:
receiving, from a cell, at least one configuration in system information; and
determining the plurality of PDCCH monitoring occasions for paging according to the at least one configuration.

14. The method of claim 13, further comprising:
determining a number of the plurality of PDCCH monitoring occasions for paging in the PO based on the at least one configuration.

15. The method of claim 13, wherein the at least one configuration includes a Paging Control Channel (PCCH) configuration.

16. The method of claim 12, wherein the second PDCCH monitoring occasion is subsequent to the first PDCCH monitoring occasion in time domain.

17. The method of claim 11, further comprising:
stopping monitoring the second PDCCH if the UE does not successfully decode the first PDCCH.

18. The method of claim 11, wherein the paging stop indicator is contained in paging Downlink Control Information (DCI).

19. The method of claim 11, wherein the paging stop indicator is contained in a Radio Resource Control (RRC) message.

20. The method of claim 11, wherein the first PDCCH and the second PDCCH are associated with a same Synchronization Signal/Physical Broadcast Channel Block (SSB).

* * * * *